United States Patent
Krinsky

(10) Patent No.: US 7,962,443 B2
(45) Date of Patent: Jun. 14, 2011

(54) METHOD AND SYSTEM FOR REPLACING DATA IN A STRUCTURED DESIGN TEMPLATE

(75) Inventor: Anthony Krinsky, Wynnewood, PA (US)

(73) Assignee: Interactive Documents, LLC

( * ) Notice: Subject to any disclaimer, the term of this patent is extended or adjusted under 35 U.S.C. 154(b) by 759 days.

(21) Appl. No.: 11/933,396

(22) Filed: Oct. 31, 2007

(65) Prior Publication Data

US 2008/0065634 A1    Mar. 13, 2008

Related U.S. Application Data

(60) Provisional application No. 60/900,239, filed on Feb. 8, 2007.

(51) Int. Cl.
G06F 7/00 (2006.01)
G06F 17/00 (2006.01)
G06F 17/30 (2006.01)

(52) U.S. Cl. .................................. 707/602; 707/802
(58) Field of Classification Search .................. None
See application file for complete search history.

(56) References Cited

U.S. PATENT DOCUMENTS

| | | |
|---|---|---|
| 5,652,850 A | 7/1997 | Hollander |
| 5,806,071 A | 9/1998 | Balderrama et al. |
| 5,909,570 A * | 6/1999 | Webber ........................ 703/13 |
| 6,151,608 A * | 11/2000 | Abrams ...................... 707/679 |
| 6,222,847 B1 | 4/2001 | Ball et al. |
| 6,529,217 B1 | 3/2003 | Maguire, III et al. |
| 6,931,591 B1 | 8/2005 | Brown et al. |
| 6,968,339 B1 | 11/2005 | Stephens |
| 6,978,046 B2 | 12/2005 | Robinson et al. |
| 6,996,581 B2 | 2/2006 | Houston et al. |
| 7,013,297 B2 | 3/2006 | Miksovsky |
| 7,039,594 B1 | 5/2006 | Gersting |
| 7,069,269 B2 | 6/2006 | Morris |

(Continued)

FOREIGN PATENT DOCUMENTS

JP    2004334372    11/2004

(Continued)

OTHER PUBLICATIONS

Intego, "Map Intelligence Excel Client," online movie available at http://www.integeo.com/custom/movies/Excel/MIExcelClient20530Seconds.htm, last accessed Feb. 1, 2008.

(Continued)

Primary Examiner — Uyen T. Le
(74) Attorney, Agent, or Firm — Christopher Paul Mitchell

(57) ABSTRACT

A method and system for replacing data in a design template. An end-user may provide a dynamic, structured client data set to be adapted to a predetermined, structured design template (e.g., a map or report). A repository of design templates may be searched to discover a list of candidate templates that may be capable of matching the client data. The end-user may select a design template that may be capable of showing the client data. The server may match the client data to a data structure for a candidate design template by using a data replacement approach, such as a column/alias approach. The end-user may potentially enlarge the matching set by providing information to help the matching algorithm; for example, providing column aliases where the matching algorithm may match template data column and column alias names with those specified for the client dataset.

28 Claims, 22 Drawing Sheets

U.S. PATENT DOCUMENTS

| | | |
|---|---|---|
| 7,126,704 B2 | 10/2006 | Miura et al. |
| 7,134,084 B1 | 11/2006 | Rashid et al. |
| 7,171,414 B1 | 1/2007 | Nazem |
| 7,177,949 B2 | 2/2007 | Bracewell et al. |
| 2002/0143749 A1 | 10/2002 | Hartel et al. |
| 2002/0143820 A1 | 10/2002 | Eaton et al. |
| 2004/0015783 A1 | 1/2004 | Lennon et al. |
| 2004/0181543 A1 | 9/2004 | Wu et al. |
| 2005/0060647 A1 | 3/2005 | Doan et al. |
| 2005/0237268 A1 | 10/2005 | Steinmann et al. |
| 2006/0041685 A1 | 2/2006 | Bracewell et al. |
| 2006/0236254 A1 | 10/2006 | Mateescu et al. |
| 2007/0016561 A1 | 1/2007 | Laustsen |
| 2007/0055944 A1 | 3/2007 | Rashid et al. |
| 2007/0061428 A1 | 3/2007 | Haley et al. |

FOREIGN PATENT DOCUMENTS

| | | |
|---|---|---|
| JP | 2006155081 | 6/2006 |
| JP | 2006238248 | 9/2006 |
| WO | WO2005050484 | 6/2005 |
| WO | WO2006075667 | 7/2006 |
| WO | WO2006117643 | 11/2006 |
| WO | WO2006122886 | 11/2006 |
| WO | WO2007006127 | 1/2007 |

OTHER PUBLICATIONS

Slashdot, "Intel Releases Mashups for the Masses", available at http://slashdot.org/articles/07/09/23/1633249.shtml, last accessed Feb. 1, 2008.

* cited by examiner

| Template Dataset | | Client Dataset | |
|---|---|---|---|
| Col Name | Col Alias | Col Name | Col Alias |
| George Bush | | John Smith | |
| John Kerry | | Mary Doe | |

No Match

Ex. 2

| Col Name | Col Alias | Col Name | Col Alias |
|---|---|---|---|
| George Bush | Republican, TXT1 | John Smith | Republican |
| John Kerry | Democrat, TXT2 | Mary Doe | Democrat |

Matches

Ex. 3

| Col Name | Col Alias | Col Name | Col Alias |
|---|---|---|---|
| George Bush | Republican, TXT1 | John Smith | TXT1 |
| John Kerry | Democrat, TXT2 | Mary Doe | John Kerry |

Matches

FIG. 6

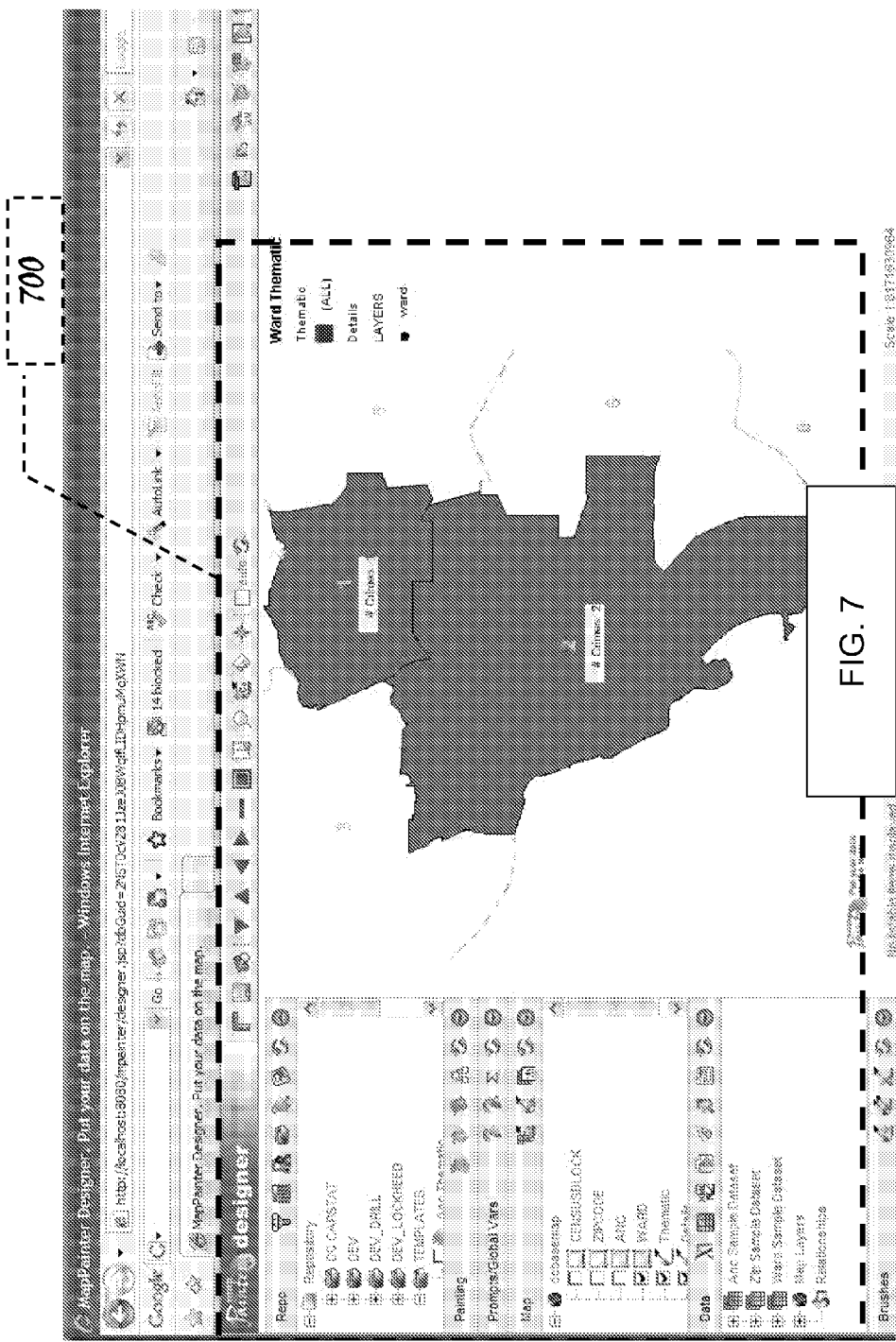
Fig. 7 Example map template designer

Fig. 8 Map template designer showing simple "Dummy" dataset showing columns "WARD" and "AMT"

Fig. 9 Map template designer column alias (matching hints) editor for column "AMT". "Crime" is an alias.

Fig. 10 Example client data capture application prior to discovery/invocation (import/refresh link)

Fig. 11 Client data capture application showing matched maps

Fig. 12 Thematic ward map representing data entered into client data capture application.

Fig. 13 Client-side query and analysis application with embedded map selector control and data grid. No map selected.

Fig. 14 Dynamically bound map ("Ward Thematic") shown inside the client query and analysis application. Report filter: STOLEN AUTO

Fig. 15 Dynamically bound map ("Ward Thematic") shown inside the report. Report filter: ADW (assault with deadly weapon)

Fig. 16 Dynamically bound map ("Ward Thematic") shown "popped up" in its own viewer. Client query and analysis application seen in background.

Fig. 17 Embedded client-side map selector showing additional matching maps (reports)

Fig. 18 Client-side, alternative map visualization ("Ward Descriptive") selected Fig. 19 Client-side column-name alias (match hint) editor, showing near matches below to help inform creation of match hints.

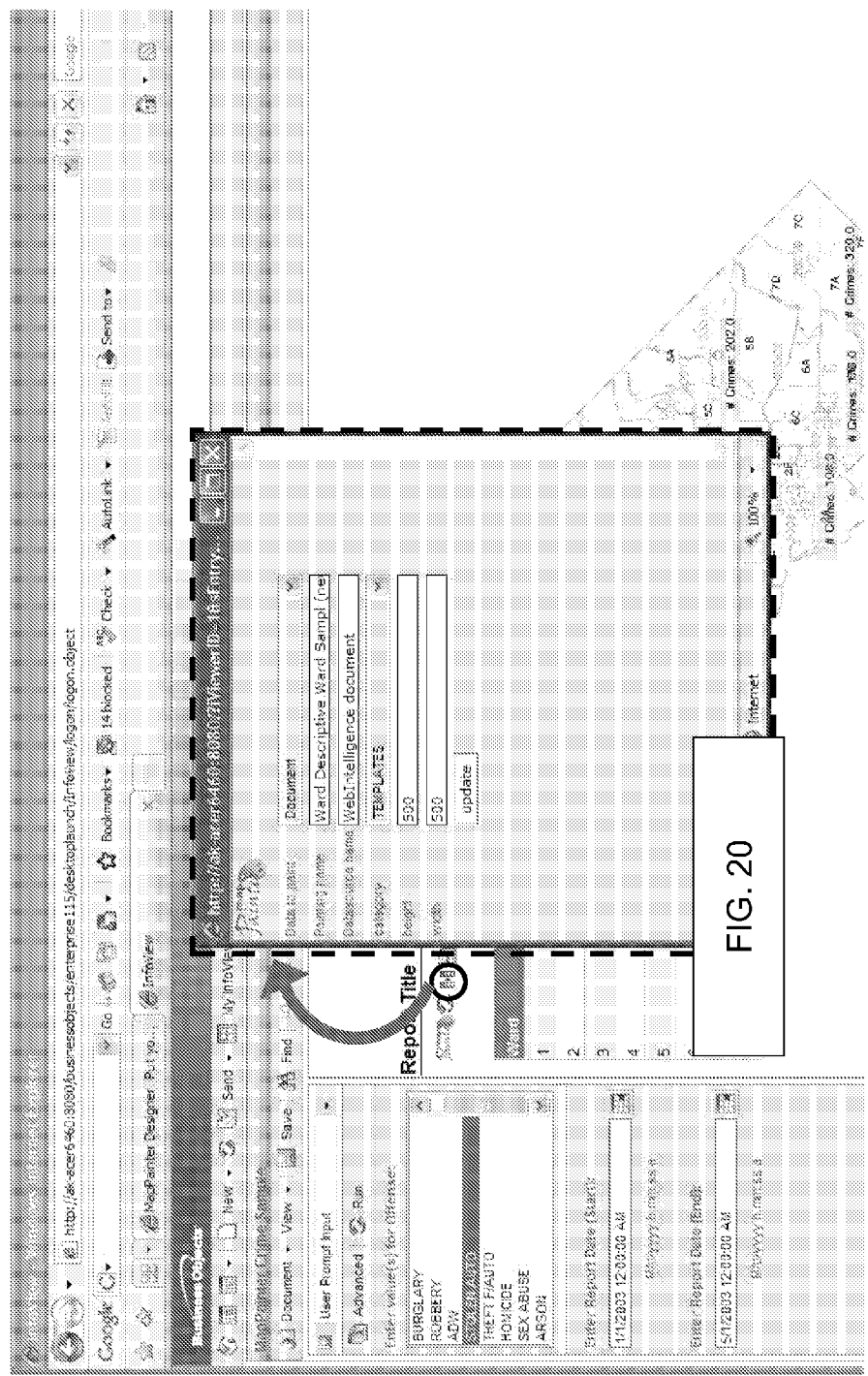
Fig. 20 Client-side map properties dialog, in which client-end-users may enter parameters or fill prompts.

METHOD AND SYSTEM FOR REPLACING DATA IN A STRUCTURED DESIGN TEMPLATE

CROSS-REFERENCE TO RELATED APPLICATIONS

This application claims priority from provisional application Ser. No. 60/900,239, filed Feb. 8, 2007, the disclosure of which is hereby incorporated by reference.

BACKGROUND

1. Field

Embodiments of the present invention relate generally to design templates and, more particularly, to replacing data in structured design templates.

2. Description of the Related Art

Being able to represent structured data in complex graphical representations can help businesses and organizations to identify successes, failures, trends, and opportunities for greater effectiveness. Reports, which may include data grids, charts, pictures, maps, and other data and non-data driven sections, are the most common way to represent and facilitate analysis of data.

A geographical map is a non-limiting example of such a report. Many examples put forth herein concern maps. However, the same concepts are applicable to all software that can create reusable design templates, through which data may be visualized or analyzed.

To give a richer context, let us consider the following examples which describe the benefits of representing data on a geographical map. Regarding business and public interest, examples may include: highlighting sales by geographic region; tracking marketing spending and effectiveness by geography; visualizing theft by geography; correlating data, such as weather or demographics, with sales; and visualizing data geographically over time, such as the spread of contaminants, disease, changing personal preferences, or sales. Regarding politics, examples may include: visualizing constituents by affinity, and/or by geography; showing voter turnout and election results by political jurisdiction; and displaying get out the vote (GOTV) efforts and activities.

There are many ways to show data on a map. For instance, one can represent sales in a particular geography by a semi-transparent round circle, whose size depends on the amount of sales. If the map is presented interactively, it may be possible to "drill" into the map by clicking on a geographical region or a zoom tool of some kind. Drilling may refresh the map, thereby showing other data. For instance, a more detailed breakdown of sales in that geographical region, denoted by color coding zip codes or pictographs such as dollar signs may be shown on the map. Other examples of additional data that may be displayed include text overlays showing monetary amounts in various colors and labels or annotations based on data-driven rules or other logic. For example, if sales were greater than $10,000, the actual amount of sales could be written on a circle in small blue print, rounded to the nearest thousand and represented using a dollar sign.

There are different ways to represent data, and creating sophisticated representations such as maps typically may require learning and using different software tools in different situations, such as different job environments. In addition, creating complex representations such as maps may often require formatting data in very specific ways and placing it in special data providers so that the mapping software can access the data properly.

Such representations are typically created in sophisticated tools that permit a high degree of control over fonts, layouts, colors, data, etc. They may permit scripting or even compiled code and require varying levels of training and expertise. They are typically built by an expert and updated periodically as required. They may be very sophisticated and difficult to perfect—sometimes even created and tested in one environment, and then deployed to another. The amount of knowledge and time required to format and properly situate the data, configure, and define rules for rendering the data using such tools may be prohibitive for most non-technical and business users for whom "reporting" is not a primary job function. As such, the graphical template design function may often be performed by an expert or power user.

Tools designed for this purpose are continually evolving. Applications such as Business Objects™ Xcelsius™ provide a graphical environment for adding data bound Adobe™ Flash™ components to a canvas. These components may be linked together creatively and bound to a Microsoft™ Excel™ worksheet as a design-time data source. At run-time, a high degree of user interaction is permitted and the components ("report") can "pull" data from a wide variety of data sources or data from a wide variety of data sources can be "pushed" to the report. Other tools such as Business Objects™ Crystal Reports™, Business Objects™ WebIntelligence Reports™, and Cognos™ Report.Net™ are representative of the genre. However, a report may be also something more crude (without a graphical, design-time environment), such as a web-page programmed in a language like PHP.

How client end-users view and access data varies. In a "production reporting" scenario, client end-user is a consumer of a report created by a reporting export, as described. The client end-user explicitly invokes the report, which may or may not require parameterized inputs, to render it on-screen or to an output device like a printer. Alternatively, such a report is run by the system at certain intervals, in response to a system event, or through other means. In a typical workflow, the client's interaction with the report summarily ends after examining and/or printing the report. In these cases, the details concerning where and how data was fed to the report is not necessarily known by the report consumer.

Accessing reports in this manner is quite different from a "query and analysis" approach where the client end-user assumes control of the investigation. At a minimum, this investigation begins with running a production report—which could be a web page of any kind—but typically entails self-service analysis of the data using a tool like Microsoft™ Excel™ or Business Objects™ WebIntelligence™. In this scenario, the client end-user queries (or otherwise obtains) data and then manipulates it in various ways, eventually producing one or more data grids accompanied by simple graphical representations, like charts. Tools designed to facilitate this scenario often trade ease-of-use for advanced functionality including layout precision. In such a scenario, getting the right numbers, or high-level analysis, may be more important than pretty pictures or complex interactions. Moreover, to create new visualizations requires knowledge of the tool and additional end-user work. While it is often possible to create formulas, precise control of formatting, pixel-by-pixel, typically is not, or is sufficiently time-consuming that client end-users will not do it.

But what if a client end-user, staring at a grid of data in either a report or self-service investigative tool, wanted a pretty, pixel-perfect formatted version of it quickly—to see it (possibly contextualized with information from other sources) in a richly formatted Crystal Report™ or on a map? What if they wanted to allow complex interactions or representations that required the use of an authoring tool they could not or did not want to operate for a variety of reasons?

In a conventional approach, there is no acceptable solution to this quandary. Why? Because there is not an effective means to match and populate arbitrary client data with ready-built graphical templates ("reports"). Users would need to create the report themselves or queue up to have it created for them. Either way, time, money, and tempers may be exhausted.

However, if suitable templates did already exist and data could be shown on them easily, the quandary would be resolved. Instead of learning how to build fancy reports, client end-users would simply choose a suitable report template from a matched list presented to them by a report discovery and matching system.

Relevant related art falls into predominantly two categories: schemes that simplify creating visualizations (using templated visualizations) and schemes for showing data in templates generally. A desirable, robust framework, that effectively facilitates repurposing data from client applications to potentially complex reports, has not been developed.

In a conventional approach to data visualization, the client end-user is deeply involved in the creation of that visualization (ie. chart, table, report) process. In such a scenario, simplifying the process of creating such visualizations is the software design priority. Such systems are designed to do as much as possible, with as little user input as possible. For instance, highlighting a block of data on a spreadsheet and then clicking a chart icon may automatically create a chart that adjusts itself to accommodate the range of data values provided. Alternatively, a wizard may launch, walking the client end-user through a number of steps (some optional) before showing the visualization (ie. chart, map, table, report). The wizard may be "smart" but the burden of creating it is still on the client end-user and what is shown is limited by the client end-user's ability, time, and effort—as well as the software.

Along these lines, an approach is described in U.S. Pat. No. 6,529,217 issued to Maguire, III et al, which involves drag and drop graph creation. That is, Maguire relates to creating a graph using an interface containing icons representing data fields, templates including drop areas, and enhanced user feedback. In this instance, the graph is the template and the methodology makes it easier to create an instance of a graph.

Another approach is described in U.S. Patent Application Publication No. 2007/0016561 by Laustsen. The Laustsen approach relates to creating data reports using a tool that displays an overview of data to a user and allowing a user to select from available data to create a report.

Another conventional approach to show data more easily, is to explicitly map content records to display handler templates which format and beautify the data—for instance, as a web-page or a magazine article.

Another conventional approach is described in U.S. Patent Application Publication No. 2004/0181543 by Wu et al. The Wu application describes a possibly fixed universe of approximately 10 well-known "templates" that have limited rendering flexibility and serve the primary purpose of clarifying data content, relationships, and semantics. In the Wu system, browsing and binding data to these templates is part of an iterative process of data discovery designed to facilitate correct use of federated data. Although such an approach may be useful for "peeking at" or "profiling" data from different sources, it may not be useful for representing user data graphically for analysis.

In the related art, embodiments of the client end-user driven template creation process (ie. build a map from data in a Microsoft™ Excel™ worksheet) that also permit saving and reusing the graphical representation as a "template" that may be associated with the client data application and reused in some fashion were found. However, such embodiments proved to be critically limited. For instance, binding between the "template" and the client data source is primitive and explicit. Since client and template data are not analyzed prior to matching, incompatible templates could be presented invoked and may fail unexpectedly (since column names and data types do not match perfectly). Moreover, without a flexible and robust matching process, the universe of candidate templates is very small and thus, template reuse is critically limited.

In neither related art nor the marketplace, does a solution appear to exist that allows client end-users the flexibility to query, assemble, and analyze data in spreadsheets, reports, or other applications, and ALSO the ability to easily present that data on arbitrarily complex, pre-made templates. Accordingly, there is a need for a versatile method and system for representing data that is easy for an average user to use. There is also a need for a data-aware method and system that is useful for representing user data.

BRIEF SUMMARY

According to an aspect of the invention, a method is provided. The method may include (A) receiving a user data set, the user data set including a first plurality of fields, and (B) determining whether the user data set matches a design template, the design template including a second plurality of fields, based on a comparison between the first plurality of fields and the second plurality of fields.

According to another aspect of the invention, a method is provided. The method may include designing a design template including a design template plurality of fields, and storing the design template in a repository, the design template plurality of fields to be compared with a later input user data set plurality of field.

According to another aspect of the invention, a method may be provided. The method may include receiving a user data set, the user data set including a first plurality of fields, and determining whether the user data set matches a target data set, the target data set including a second plurality of fields, based on a comparison between the first plurality of fields and the second plurality of fields.

According to another aspect of the invention, a design and data replacement system may be provided. The design and data replacement system may include a client to receive a user data set, the user data set including a first plurality of fields, a design environment to design a design template, the design template including a second plurality of fields, a repository to store the design template, and a delivery system to match the user data set with the design template by comparing the first plurality of fields with the second plurality of fields.

The foregoing and other aspects will become apparent from the following detailed description when considered in conjunction with the accompanying drawing figures.

BRIEF DESCRIPTION OF THE DRAWINGS

FIG. 6 is a column chart from a map template according to an embodiment of the invention;

FIG. 7 is a graphic image of a GUI (graphic user interface) for an example template designer, according to an embodiment of the invention;

FIG. 20 is a graphic image of a GUI (graphic user interface) for an example client-side map properties dialog, in which client-end-users may enter parameters or fill prompts, according to an embodiment of the invention.

DETAILED DESCRIPTION

Figure 1:
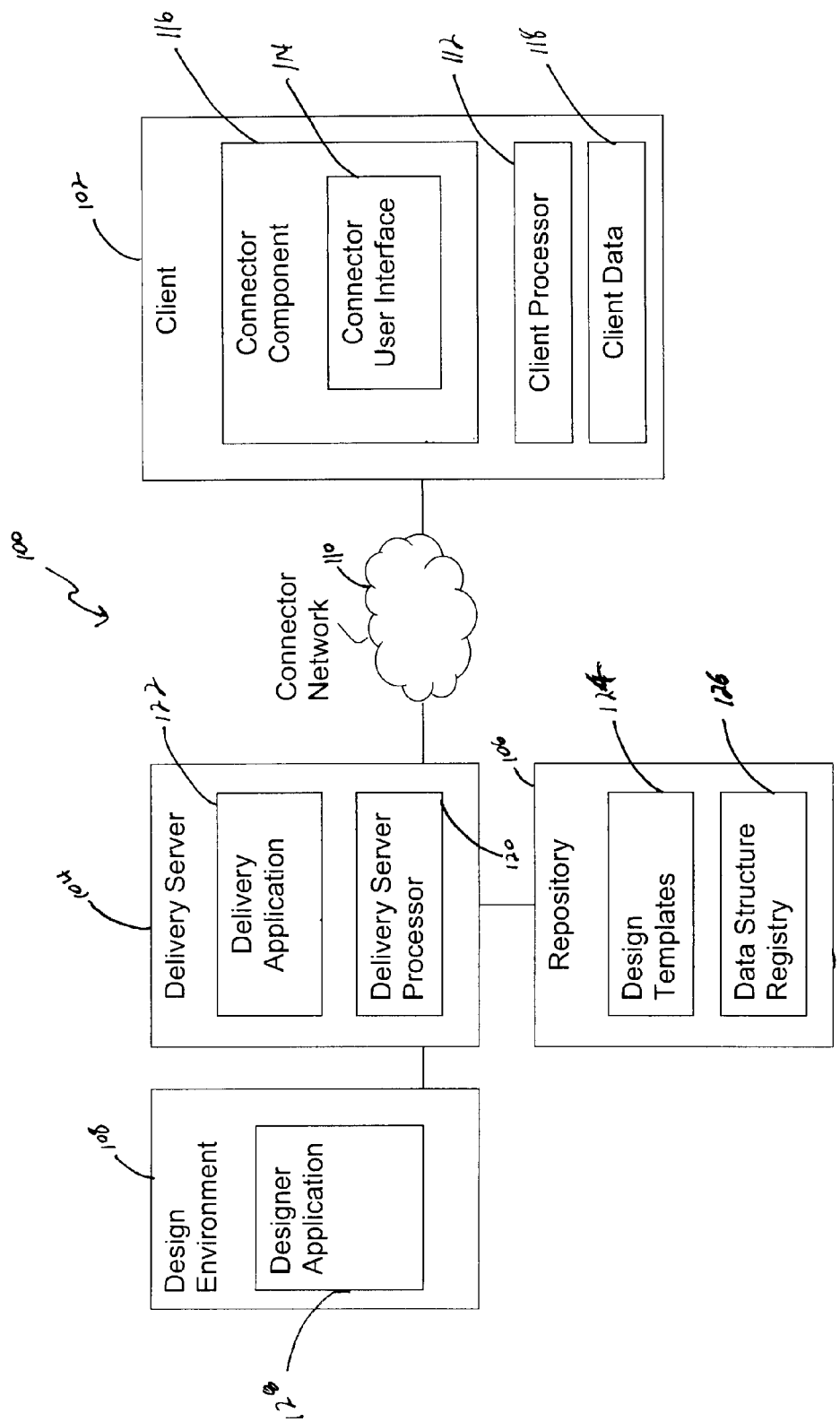
FIG. 1 is a schematic diagram of a design and data replacement system according to an embodiment of the invention.

Reference will now be made in detail to embodiments of the present invention, examples of which are illustrated in the accompanying drawings, wherein like reference numerals refer to the like elements throughout. The embodiments are described below to explain the present invention by referring to the figures.

As used herein, the terms "a", "an" and "the" may refer to one or more than one of an item. The terms "and" and "or" may be used in the conjunctive or disjunctive and will generally be understood to be equivalent to "and/or".

In overview, an embodiment of the invention may relate to a method and system for replacing data in a design template. An embodiment of the invention may support a methodology for matching arbitrary structured data to a structured template and showing data within it. An end-user may provide a client data set to be adapted to a design template (e.g., a map or report). The data set may be structured data that may be dynamic; that is, the client data set may be new or different in each case including, for instance, column headers and the data itself. Broadly, an approach of an embodiment of the invention may be to match the dynamic structured data set to a predetermined design template that may also be structured. A repository of design templates may be searched to discover a list of candidate templates that may be capable of matching the client data. The end-user may select a design template that may be capable of showing the client data. The server may match the client data to a data structure for a candidate design template by using a data matching algorithm; for example, matching column and column alias names between the source and target. The end-user may potentially enlarge the matching set by providing information to help the matching algorithm; for example, providing column aliases where the matching algorithm matches template data column and column alias names with those specified for the client dataset.

The data replacement methodology of an embodiment of the present invention may permit non-technical end-users to visualize their data on arbitrarily complex design templates (e.g., maps or reports) in a relatively easy and straightforward manner. This means that without prior knowledge of the templating/reporting/mapping system, a naïve end user working with data, may be presented a series of design templates, capable of showing his or her data. From the system standpoint, there may be no prior knowledge of what data the end-user is attempting to represent (e.g., put on the map or report). In an approach of an embodiment of the invention, the system may "discover" design templates (e.g., maps or reports) capable of showing whatever data are in use (that is, the data provided by the end-user or other source). Exemplary design templates may include map templates and report templates. Exemplary report templates include report templates developed with tools like Business Objects™ Crystal Reports™, WebIntelligence™ or Xcelsius™, Hyperion™ Brio™, Cognos™ Report.Net™, Microsoft™ Reporting Services™, Google™ Maps, or any number of other commercial or home-grown tools that may facilitate formatting, manipulating, and representing data to enhance understanding and meaning of the data.

Using the mapping example to illustrate, from the perspective of end-users, putting their data on the map may be fairly instantaneous. As an end-user is working with a mapping enabled source system according to the principles of an embodiment of the invention, the system may be interrogating map templates using one or more matching algorithms and may be presenting a list of candidate maps to the end user. The end-user may choose a map on which to show his or her data and optionally update column aliases to match more maps, set map properties, and take some final action to complete the mapping data replacement. The map may then appear in the context of the end-user's current application, in another window, application, or be fed to another process for printing, storage, transmittal to another party, or post-processing—among other possible outcomes.

An approach of an embodiment of the invention may support the idea of a domain or subject-tailored graphical template, that may be optimized for the display of a certain class of data with the expectation that the data may contain typically a fixed number of columns of certain data types and whose values may generally fall within certain ranges or have a certain format. For instance, one column of data may measure percent completeness. Its range of values may be between 0 and 100 percent. Another example may be a time period since last doctor visit, which may be expected to fall within the lifespan of an adult. A further example may be a certain kind of label, which may be expected to be no more than 50 characters long.

In such cases, data may have semantic meaning and optimal representations may take into account that semantic meaning. An illustrative application of an embodiment of the invention may be the creation of multiple templates to show results from political elections. One may create a semantically meaningful template that may render data for the first column of data as varying sized (based on % votes won) elephant glyphs, which may be representative of the Republican political party. The second column may render as donkeys, which may be representative of the Democratic political party. There may be a collection of templates for displaying results from races between 2, 3, and 4 candidates. Another collection of templates, or a variation thereof, may highlight voting last year (in contrast with the race being analyzed with replacement data). Others may focus on another facet of the political process; for example, demographic information or historical political affinity, or get out the vote (GOTV) efforts, juxtaposed with current race results (data sourced from the client application).

More generally, an approach of an embodiment of the invention may provide for the replacement of complex (many columns), or semantically meaningful data in various design templates. Using an approach of an embodiment of the invention, it may be possible to build a graphical template that renders any arbitrary set of numbers or text as labels placed at specific coordinates on a map. While this is a valid scenario for an embodiment of the invention, it may not fully exercise the dataset matching intent of an embodiment of the invention because the data may be structurally similar, but may have no semantic meaning that would affect representation based on specific ranges or data values, and may make arbitrary matching between data of same types insufficient for rendering an appropriate graphical representation of the data. If the renderer put a checkbox on the map for a value between 50% and 100%, supplying a value of 10,256 for the value suggests that this kind of data (whatever it is) was not anticipated, by the template designer, to be placed on the template.

Let us consider another example, where semantic matching between datasets may matter. Consider that the results from a 3 car NASCAR challenge race, by race event, may be structurally similar to the data for a 3 candidate political race. However, the design template created for the political use-case may not make sense showing data from the NASCAR dataset. Conversely, a design template created for a 3-car race may not make sense showing data from the 3-candidate political race. In support of the system's ability to distinguish one case from the other, column names, column name aliases, data descriptors or hints, and other means of matching semantic meaning may be used in the map selection process. Data structure alone (e.g., number of columns and their data type) sometimes but not always provides sufficient information for choosing the appropriate map (or more generally, graphical representation).

The importance of robust matching is greater when semantics matter, however, the invention is useful even when the template is generic and semantics do not matter.

The design templates may be for various types of graphical representations, including in isolation or combination, bar charts, pie charts, other geometric charts, and other representations of data. For example, a map template may be combined with other data representations, such as one or more pie charts displayed on the map, next to the map, or otherwise in conjunction with the map. End-users may ask the system to discover graphic data representations that may match the replacement data from a larger selection of different types of graphic representations, if the data has a suitable structure, format, and semantic meaning, for use with an approach of an embodiment of the invention.

Also, templates may have multiple data sets, and an approach of an embodiment of the invention may not require all data sets to be replaced, and one or more data sets may be replaced.

Additionally, an approach of an embodiment the invention may not require all of the client data to be used. In one embodiment, client data may be chosen automatically based on the context in which it is used—for example, the current page of a report or the current worksheet of a spreadsheet. However, in another embodiment, the template matching process may not begin until data may be selected by the client—for example, by highlighting a range of cells in a worksheet, or clicking on checkboxes in a report.

Template Data Replacement Methodology

The template data replacement methodology of an embodiment may involve two classes of activities: (1) The template designer may design templates (e.g., maps, data representations, or other templates) and save them in the repository; and (2) the end-user, working with data, may be presented with a list of matching templates that may be capable of showing the data provided by the end-user, and subsequently may select one of the templates.

Components of a Template Design and Data Replacement System

FIG. 1 is a schematic diagram of a design and data replacement system 100 according to an embodiment of the invention. The design and data replacement system 100 may include a client 102 that may be accessed by end-users, a delivery system 104 (such as a delivery server), a repository 106, and a design environment 108 that may be used by designers of templates. The client 102 and delivery server 104 may be connected by a connector network 110.

The client 102 may be an electronic device including computing capabilities, such as a desktop computer, a laptop computer, a palmtop computer, a PDA, a mobile communications device (e.g., cell phone), a hybrid device (e.g., a device including both mobile communications and digital computing capabilities) or any other suitable device. The client 102 may include user input devices (e.g., a keyboard and a mouse) accessed by end-users, one or more output devices (e.g., a liquid crystal display (LCD) or cathode-ray tube (CRT) display), client data storage (e.g., volatile memory or nonvolatile data storage), and a client processor 112 (e.g., digital microprocessor). The client may have the capability of presenting design templates (e.g., maps, data representations, or other design templates) that may be discovered by the delivery server 104 and related information that may be displayed through a connector user interface 114 on the output device, such as a graphic user interface (GUI) for interaction by the end-user. The client processor 112 may execute software instructions for the connector component 116 and connector user interface 114 that may be stored in a data storage accessed by the client 102 to perform the functions of the connector component 116 and connector user interface 114 as described herein. The connector component 116 may have the ability to access client data 118 on the client 102, and present the connector user interface 114 to the end-user for choosing a design template, setting properties, and applying the client data 118 to the design template (e.g., invoking the put data on the map action).

The delivery server 104 may be a server computer, desktop computer, or other digital computing device suitable for executing the delivery application. The delivery server 104 may include a delivery server processor 120 (e.g., digital microprocessor) that may execute software instructions for the delivery application software to perform the functions of the delivery application 122 as described herein.

The repository 106 may be a mechanical or electronic data storage device that may store data persistently, such as a hard disk, or persistent IC (integrated circuit) data storage device. The repository 106 may store data about design templates 124 (e.g., maps, data representations, and/or other design templates) and may include a data structure registry 126. The delivery server 104 may receive replacement data from the client 102 provided by the connector component 116 through the connector network 110, and may access the design templates 124 stored in the repository 106 to discover one or more design templates 124 that may be capable of displaying the replacement data. The data structure registry 126 may contain information on the data structures of design templates 124 based on the replaceable data in the design templates 124. The delivery server 104 may transfer information on the data structures for discovered design templates through the connector network 110 to the connector component 116 for presentation on the connector user interface 114 to the end-user at the client 102.

The delivery server 104 may match the replacement data to the replaceable data represented in the data structures by a replacement method, such as a column/alias approach (to be described in more detail later). In one or more embodiments, the replacement model may use an artificial intelligence approach such as a rules based approach, and/or a machine learning approach, such as neural net programming, to match the replacement data to the replaceable data. In other embodiments, the replacement method may also involve matching on certain characters and/or symbols (e.g., regular expressions), a semantic analysis approach, a fuzzy logic approach, and/or a heuristic approach. In further embodiments, the replacement methods described herein may be combined into one approach using two or more of the replacement methods. A determination may be made whether the replacement data satisfies a domain membership function that may be associated with the replaceable data.

The design environment 108 may include a designer application 128 that a template designer may use to create design templates for transfer to the delivery server 104 for storage in the repository 106, and to create data structures for the design templates for transfer to the delivery server 104 for storage. In another embodiment, the design environment 108 may simply be one or more editable plain-text files on the server machine itself. These may be XML formatted. Alternatively, the design environment 108 may be a stand-alone design server including a designer application 128 and design processor (e.g., microprocessor). In this embodiment, the design processor may execute software instructions for the designer application 128 that may be stored in data storage to perform the functions of the designer application 128 and design environment 108 as described herein. In another embodiment, the design environment 108 may be part of the delivery server 104 and the delivery server processor 120 may execute software instructions for the designer application 128.

The connector network 110 may be a network suitable for providing a connection between the client 102 and the delivery server 104. The connector network may be one or more of the Internet, a local area network (LAN), a wide area network (WAN), a storage area network (SAN), a metropolitan area network (MAN), a wireless network (e.g., Bluetooth, IEEE 802.11, or other wireless network), a mobile telephone network, (e.g., cellular network based on CDMA (code division multiple access)), or any other suitable network, as well as a network to be developed in the future. The connector network may be based on any suitable medium, such as hard wired cable, fiber optic cable, wireless connections (e.g., radio wave connection or connection through other parts of the electromagnetic spectrum), and other suitable connections.

Figure 2:
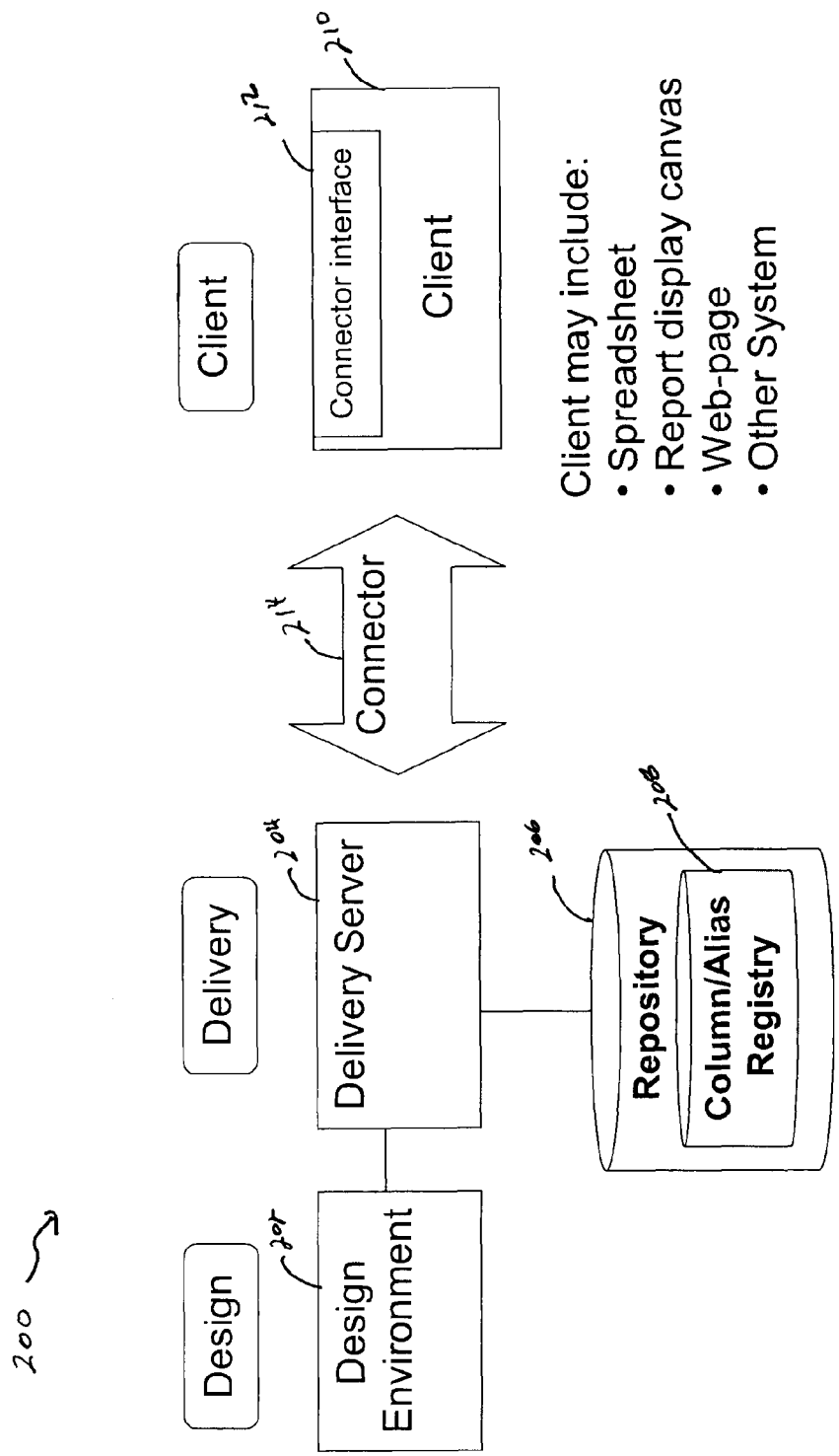
FIG. 2 is a schematic diagram of a template design system, showing the delivery workflow according to an embodiment of the invention.

Components of a Template (e.g., Map or Report) Design and Data Replacement System FIG. 2 is a schematic diagram of a template (e.g., map or report) design system 200, showing the delivery workflow according to an embodiment of the invention. The components of the template (e.g., map or report) design system 200 may include a template (e.g., map or report) design environment 202, such as the design environment 108 of FIG. 1, a delivery server 204, such as the delivery server 104 of FIG. 1, a template (e.g., map or report) repository 206, such as the repository 106 of FIG. 1, a client 210, and a connector 214. The template repository 206 may include a column/alias registry 208. The client 210 may include a connector interface 212.

On the design side, users may interact with a design tool which permits them to create a design (e.g., map or report) template that may be bound to data (e.g., a plurality of fields)—real or fake. In some cases, there may be permanent datasets which may never be replaced at run-time. These datasets may contextualize other data. However, the expectation is that some or all of one or more datasets may be replaced at run-time with replacement or client data that may be provided by end-users.

A real benefit of a methodology of an embodiment of the invention may be seen from the client side. End-users, who may not have specific technical knowledge, may interact with data in a variety of ways. They may edit data on spreadsheets, view data on reports, or access data in web-based, desktop or mainframe systems. At some point during their data interaction, they may simply select a template (e.g., map or report) and invoke the mapping action on it. Their data now appears on a map or complex graphical representation in a meaningful way.

In order for a user to map the data currently being viewed on a template (e.g., map or report), the connector component 214 may have the ability to access data (e.g., user data set including a plurality of fields) on the client 210, and present interface 212 to the user for choosing a template (e.g., map or report) and applying the data to the template (e.g., invoking the put-data-on-map) action. Other interface functions may include the ability to set properties on the template (e.g., map or report) or to modify run-time behavior of the template (e.g., map or report). In one embodiment, the end-user may not be exposed to the entire design environment at this point; the bulk of template design activity may have already been done for them.

Specifically, the connector component 214 may do the following: (1) Capture information about the data being viewed so that its data structure (typically columns) may be determined—either on the client side, or by passing an identifier back to the server 204 for parsing on the server side—and at the time of template (e.g., map or report) invocation, its data recordset (typically rows) may be determined. This function may or may not require user intervention. If the client 210 were working on a spreadsheet, an intervention-less approach may have the connector component 214 parse the current worksheet or all worksheets automatically. For a reporting environment, it may parse the current page or all pages. Alternatively, the component 214 may require the user to select a range of data or check boxes on a page, prior to invoking the template discovery process. (2) Present to the end-user a list of templates (e.g., maps or reports) that may be capable of showing their data and optionally, properties like prompts or text values that may be filled prior to invoking the map.

Figure 3:
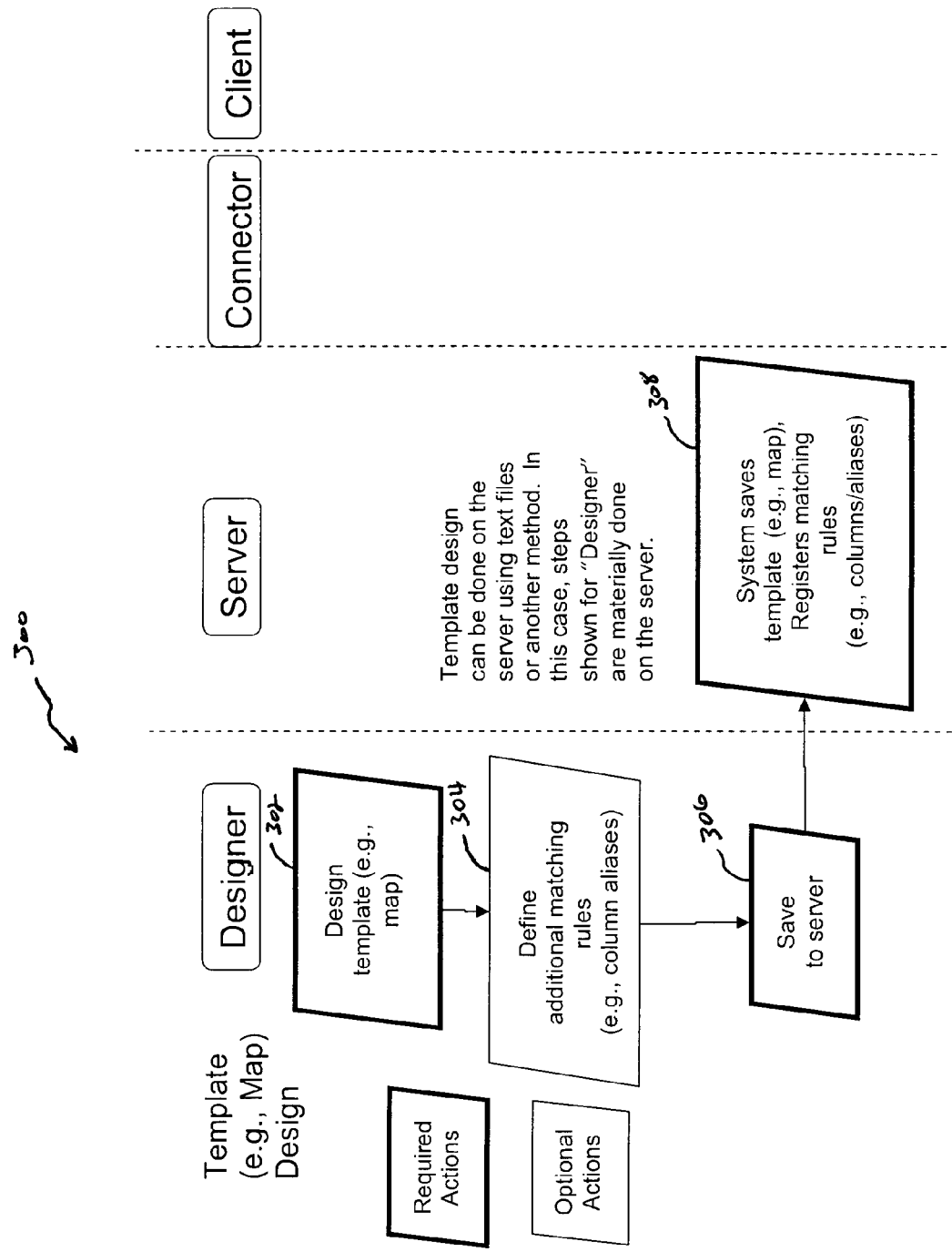
FIG. 3 is a flow chart of a template design workflow according to an embodiment of the invention.

FIG. 3 is a flow chart of a template (e.g., map or report) design workflow 300 according to an embodiment of the invention. The template (e.g., map or report) design workflow 300 may include these operations or stages: (1) A savvy, often technical user may build 302 a template in a designer application, such as the designer application 128 of FIG. 1 (e.g., template (e.g., map or report) design tool); (2.) To facilitate data replacement, the designer application optionally permits the designer to specify which data sources may be replaceable and to define aliases 304 (or other matching rules or parameters) on columns in the replaceable data sources (for an example of a column/alias approach, see FIG. 6). (3) When the template (e.g., map or report) is saved 306, the system may perform operations 308 to facilitate the template (e.g., map or report) discovery process. For instance, it may save to lookup tables, columns on replaceable data sources that are actually required for the design (e.g., map or report) template to render, and save the aliases of those columns if defined. Abbreviated representations (e.g., capitalizing or replacing underscore characters in column names), SOUNDEX equivalents, or other predefined or user driven equivalents could be created as well by default.

The non-technical user may access one or more "client" tools that may have a mapping connector component, such as the connector component 116 of FIG. 1, that may communicate with the map delivery system, such as the delivery server 104 of FIG. 1, locally or over a network. For example, the connector component may be a web-page, spreadsheet, reporting tool, or other means of capturing or displaying data. Additionally, there may be a special purpose client component or application designed expressly to facilitate inputting data and showing it on the design template. From a high-level, the non-technical user workflow may be simple. Use data. Select map. Optionally set properties on the map. Invoke map.

Figure 4A:
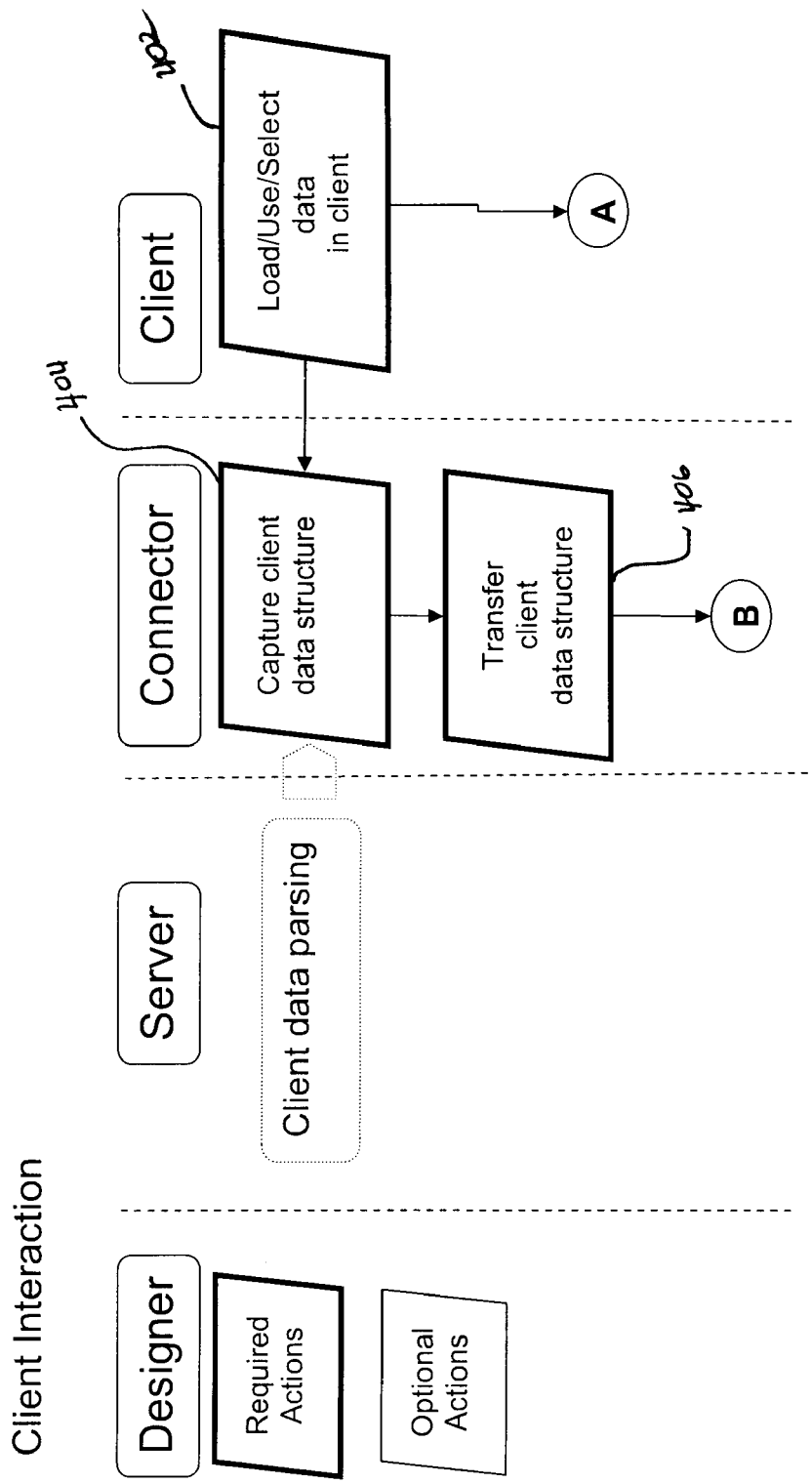
FIGS. 4A and 4B are flow charts of a client interaction workflow according to an embodiment of the invention.
Figure 4B:
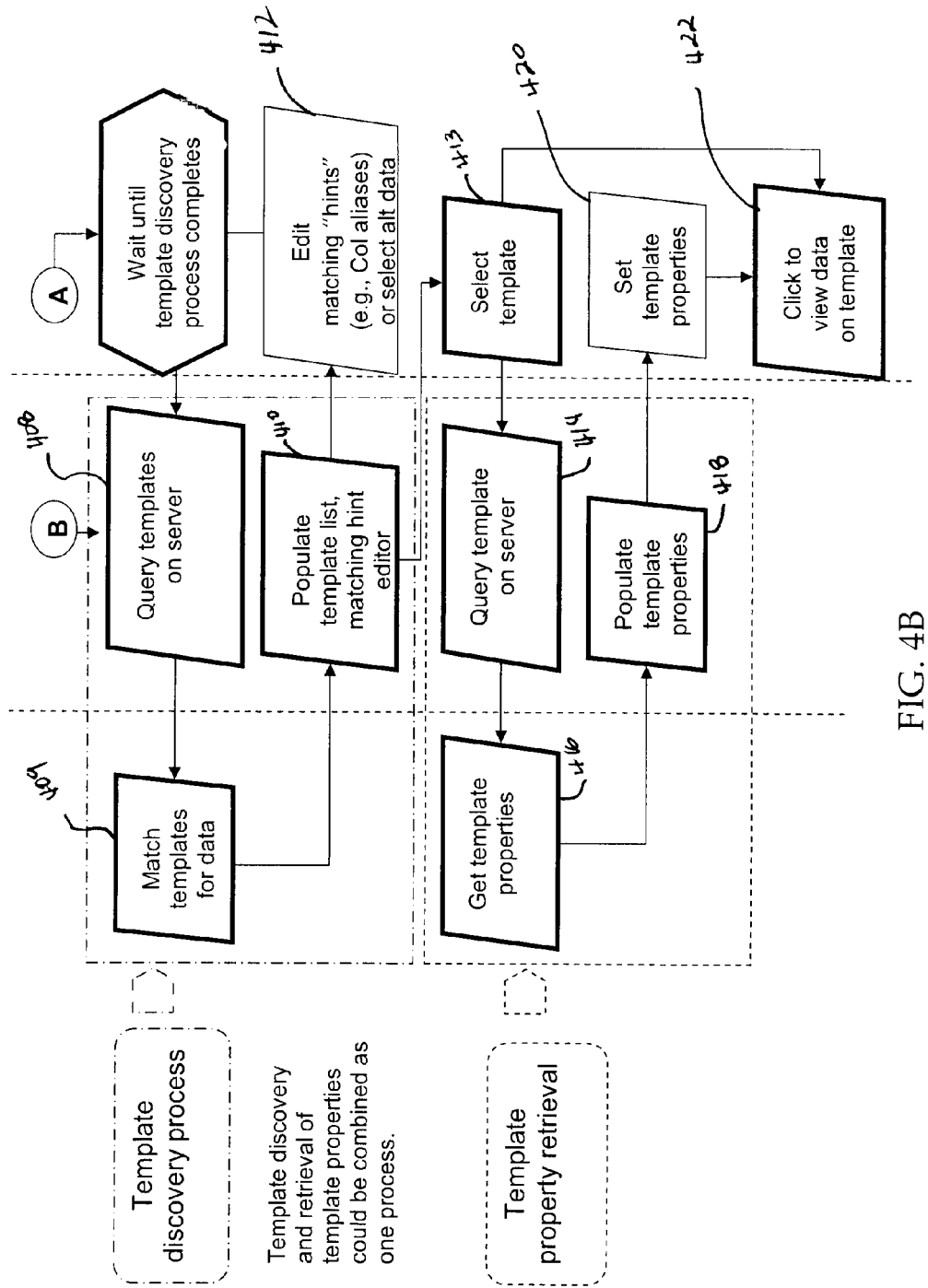

FIGS. 4A and 4B are a flow chart of a client interaction workflow 400 according to an embodiment of the invention.

During the course of normal use 402 of client data (FIG. 4A, Load/Use/Select Data in client), a connector component, such as the connector component 116 of FIG. 1 may poll 404 a server, such as the delivery server 104 of FIG. 1, every few seconds (a configurable timeout), on demand, or when data changes (implementations may vary) (FIG. 4A, Capture client data structure). Implementations of how client data is captured may vary. In a typical implementation, the current page of user data (in a report or spreadsheet, for example) may be parsed automatically and the template matching process (e.g., a comparison process) may begin automatically. Alternatively, the user may be permitted or required to select a subset of data, by highlighting a range of data, clicking checkboxes, or another selection mechanism. In this case, the template matching process could be either delayed, or repeated on a narrower subset of data. Input modifying the user data may be received from the user.

The connector component 214 may pass 406 information about the data being viewed by the business user in such a way that it or a delivery system (or server), such as the delivery server 104 of FIG. 1, may determine the structure of the data (e.g., for a map or report). This structure may include column names and column aliases, both which are examples of field "labels" as that term is used herein. (FIG. 4A, Transfer client data structure).

The delivery server may inspect 408 available design templates (e.g., maps or reports) to see if any of them contain data sources whose columns are in use, may match those of the data being viewed by the user (FIG. 4B, Query templates on server). (The template data structure may also be provided by data structure place-holders.) This may be referred to as the discovery process.

The templates may include fields. The delivery server matches 409 (or doesn't) templates on (or available to) the server (FIG. 4B, element 409) by, for example, comparing fields in the data being viewed by the user to fields in the design templates. User data sets may be matched against design templates by comparing field labels in the user data set to field labels in the design templates. This matching may include a determination of whether the field labels in the user data set and the field labels in the design templates match verbatim or match respective synonyms. User data sets may be matched against design templates by comparing a number of fields in a user data set and a number of fields in a design template data set (where, for example, a match may exist if the numbers are equal or if the user dataset includes more fields than the template data set). Similarly, data types of fields may be compared. User data sets may be matched against design templates by comparing a user data set and a data descriptor field of the design template data set. User data sets may be matched against design templates using a domain membership function. A value of a template data set field may be associated with the domain membership function, and a determination may be made whether a value of a user data set field satisfies the domain membership function. The domain membership function may define a range of values in which a value may need to fall, a semantic meaning that a value may need to have, or a phonetic feature that a value must have. The delivery server may then return 410 to the connector component a list of design templates (e.g., maps or reports) that match, as well as the column definitions of the data being viewed by the user (FIG. 4B, Populate template list, matching hint editor). Additionally, and especially if no matches were made, the system could present to the user the ability to browse the template repository and also present diagnostics on partial matches that would facilitate the provision of accurate matching hints. At this time, it may be possible that the delivery server also returns all of the properties for the design template (e.g., map or report) that the user may want to set, prior to invoking the selected template (e.g., map). This may include, for instance, prompts that filter data or drive display behaviors.

A connector component user interface, such as the connector user interface 114 of FIG. 1, may present to the user a list of design templates (e.g., maps or reports) capable of showing the currently viewed data as well as an interface for creating aliases for the data column names (FIG. 4B, Populate template list, matching hint editor). That is, a plural subset of design templates that match the user's data set may be presented to the user.

The end user may enlarge the matching set, by, for example, providing hints 412 for the dataset itself or for the columns in the dataset (FIG. 4B, Edit matching "hints" (e.g., Col aliases) or select alt data). Where the matching algorithm uses column alias matching, adding or editing aliases may force a re-query of the delivery server, possibly matching a larger number of design templates (e.g., maps or reports) since columns and aliases of the client data may each map columns and aliases of map template data sources (for an example of the column/alias approach, see FIG. 6). Additionally, if the implementation allowed or required the client to pro-actively select data in the client application, selecting another range of data may (or may not) affect the datastructure being captured by the connector, the design templates matched, and subsequent interactive steps (i.e., editing matching hints, setting template properties). Additionally, the system may provide diagnostic information on partial matches that informs the choice of hints in order to successfully match templates with as little additional effort as possible.

The user may select 413 a design template (e.g., map or report) from among those presented by the connector component (FIG. 4B, element 413). That is, a selection input of one of the plural subset of the plurality of design templates may be received from the user. If not fetched beforehand, after the user selects a template, the connector component may retrieve 414, 416, 418 properties for that template that may be set at run-time (FIG. 4B, Query template on server. FIG. 4B, Get template properties. FIG. 4B, Populate template properties).

The connector component may provide the user with the opportunity to set 420 properties on the design template (e.g., map or report) prior to its invocation (FIG. 4B, Set template properties). These properties may include the name of the soon-to-be generated design template (e.g., map or report), the replacement data source, and any prompts for the template (e.g., map or report) that may be filled when the template (e.g., map or report) is generated.

The user may invoke the selected design template (e.g., map or report), and data from the client system may be shown on the template (e.g., put on the map or report) (FIG. 4B, Click to view data on template). That is, data from the user data set may be provided into the design template, and the design template may be rendered to provide a graphical representation of the user data set. The graphical representation may be a geographical map incorporating the user data. The graphical representation may be a business report incorporating the user data.

The following figures in the next sections describe a data replacement system in terms of a map design and replacement system. The approach of an embodiment of the invention shown in these following figures and sections may also apply to other types of graphic data representations as discussed herein that are suitable for use with an embodiment of the invention.

Data Replacement Approach

In an embodiment, replacing a dataset that was defined during map design with another dataset being used in a client tool, is what may make the data replacement approach work. Identifying what templates may match and properly represent data in use is what may make it usable. Using column aliases to facilitate data matching may be part of the approach in one embodiment. Other algorithms that could be used (individually or in conjunction with one another) include but are not limited to: column (data) level matching; template-level matching; and system-level matching.

Column (data) level matching may include column alias matching, which may try to match column names through common aliases. In a template, COL1 could be aliased as ALIASX. In the client dataset, COLA could also be aliased as ALIASX. Through a shared alias, COL1 may match COLA.

Column (data) level matching may include synonym matching, which may try to match column names based on synonyms and similar words. For example, ZIP could match POSTAL CODE, ZIP CODE, MAIL CODE, etc.

Column (data) level matching may include intelligent matching, which may take into account synonyms, presence of other columns, data values, or other information to determine whether one set of data would be a suitable replacement for another. For example, when SEN appears somewhere in a column header, DISTRICT may be equivalent to CONGRESSIONAL DISTRICT or CD.

Column (data) level matching may include letter pattern matching, which may use regular expressions, SOUNDEX, stripping spaces and/or punctuation, ignoring capitalization, or other pattern matching algorithms to broaden column name equivalence. For example, ZIP_CODE=ZIP CODE=Zip Code=Zipcode=Zpcd.

Column (data) level matching may include abbreviation matching, which may perform intelligent shortenings like taking the first character of each word, stripping all but leading vowels, etc.

Template-level matching may include category matching, which may use broad categories to prevent mismatching data or templates from incongruous problem domains.

System-level matching may include permission matching, which may use roles or individual level permissions to prevent mismatching data or templates.

Which algorithms or what combination of algorithms are used for matching could be predetermined in the software or variable based on the preferences of system administrators, template designers, or client data users. Similarly, hints specific to each algorithm could be predetermined in the software or variable based on the preferences of system administrators, template designers, or client data users. An implementation that was used in the political sphere could automatically alias CONGRESSIONAL DISTRICT as CD—for any design template. This configuration may be done at the system level.

At the end of the matching process, data from the client may completely or partially replace data on the template, with the intent of producing an instance of the template that may interpret and display the client data.

Figure 5:
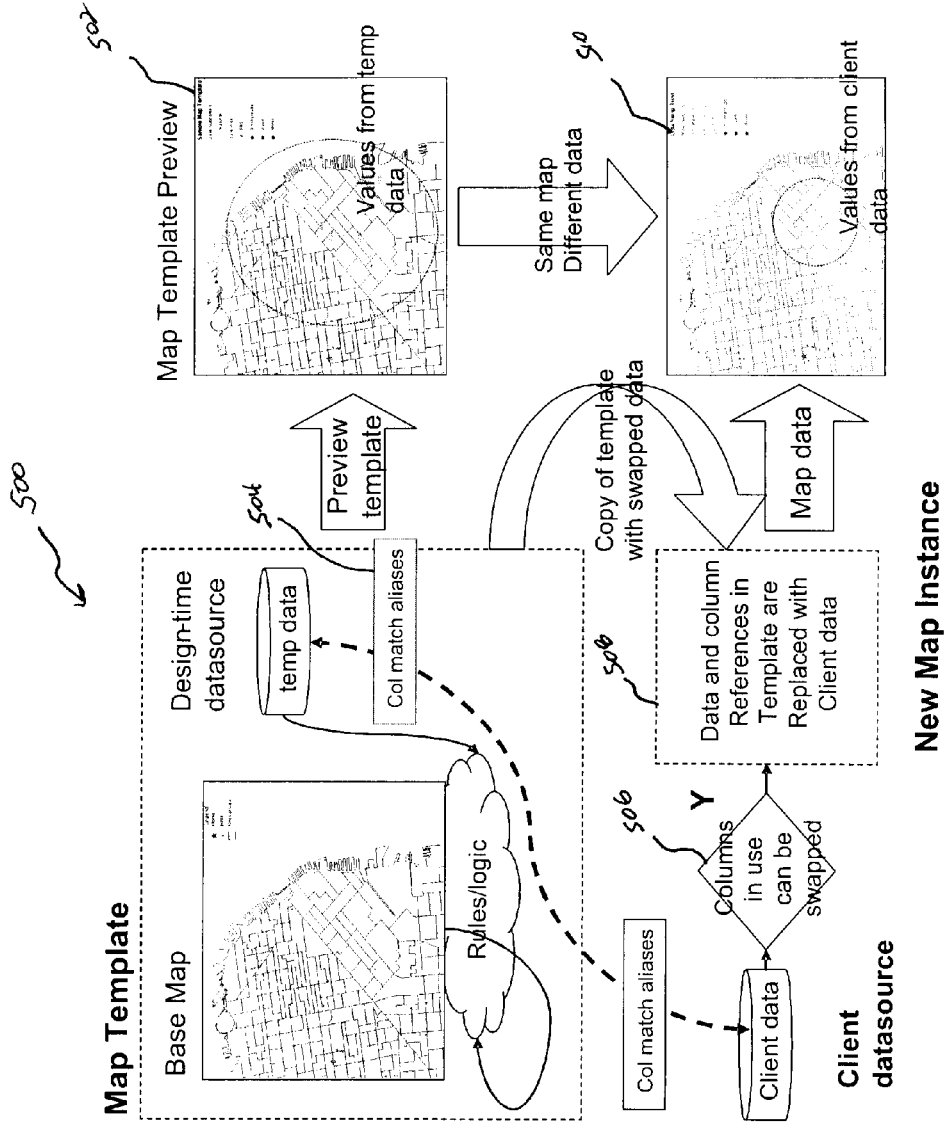
FIG. 5 is a flow chart of a data replacement process according to an embodiment of the invention.

FIG. 5 is a flow chart of a data replacement process 500 according to an embodiment of the invention. A template preview may be provided 502 based on a map template. The column match aliases may be provided 504 from the map template. The columns in use may be swapped 506, and the data and column references in the template may be replaced 508 with client data. A new map instance including values from the client data may be generated 510 based on the map template.

FIG. 6 is a column chart 600 from a map template according to an embodiment of the invention. In FIG. 6, Example 1 shows that columns from a map template using Presidential candidate data from the 2004 election do not match columns from a new dataset for a local election involving John Smith and Mary Doe.

However, if aliases are defined in the template and for the client dataset, the columns may match. When the new election results are shown on the map template, the 2004 presidential election dataset may be completely replaced. For example, in Example 2, the alias "Republican" in the new dataset may match "Republican" in the template dataset. In Example 3, the alias "TXT1" in the new dataset, may match "TXT1" in the template dataset. Thus, all references to the "George Bush" column in the map template may be replaced with references to "John Smith." A similar process may apply to other columns.

Data replacement may be used on more than one data source simultaneously. Practically, this may occur infrequently since most end-users use one data source at a time.

Map Design Workflow

Example Using a Graphical Design Template Designer Application

FIG. 7 is a graphic image of a GUI (graphic user interface) for an example map editor 700 for designing a map, according to an embodiment of the invention. This application permits an expert user to bind the design template to a map service and then define how data is to be shown on it. In one embodiment, the connector component application may be the MapPainters$^{SM}$ "designer" application, available from Interactive Documents, LLC of Wynnewood, Pa.

Figure 8:
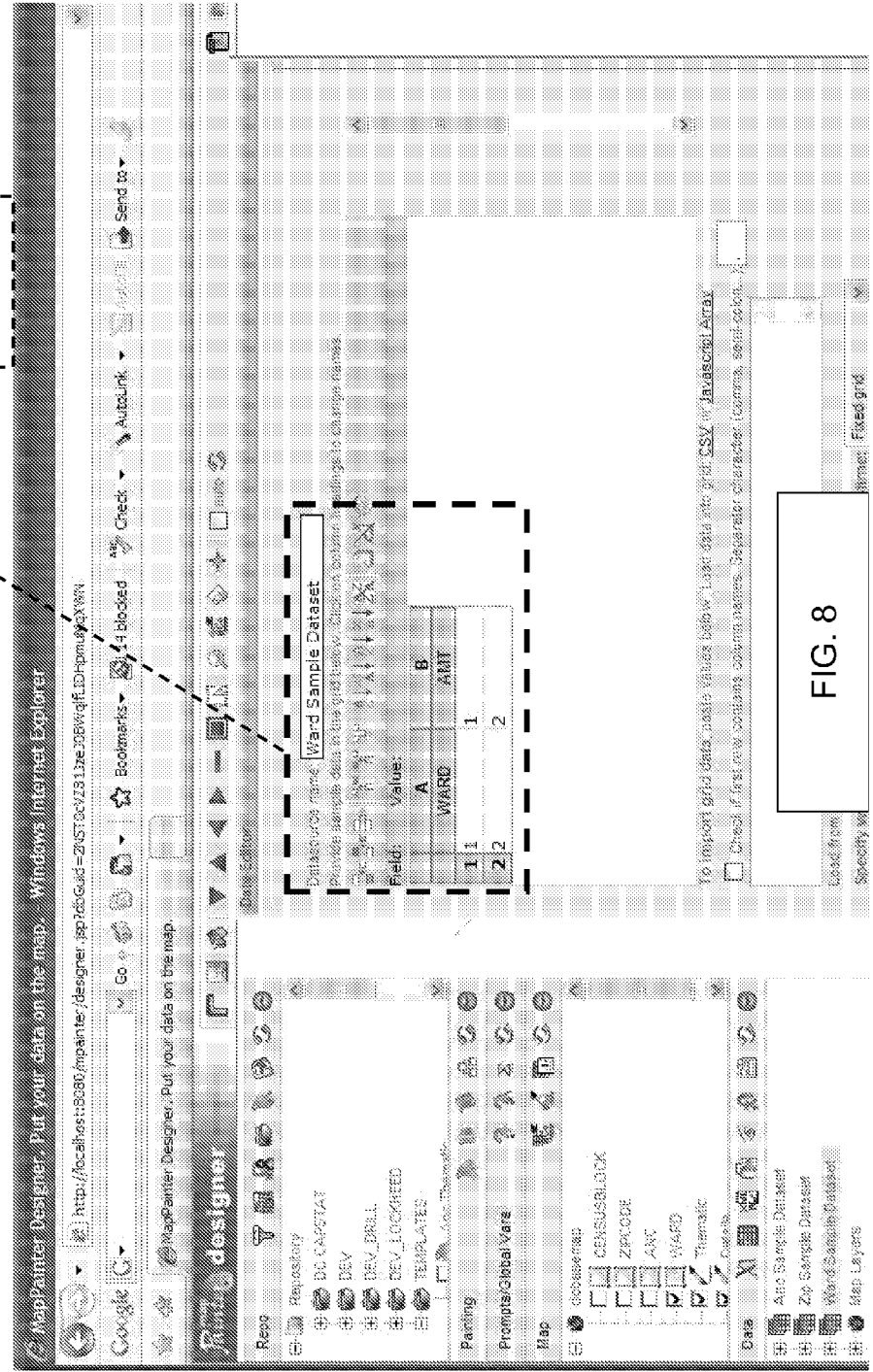
FIG. 8 is a graphic image of a GUI (graphic user interface) for an example template designer showing simple dummy dataset called "Ward Sample Dataset" showing columns "WARD" and "AMT", according to an embodiment of the invention.

FIG. 8 is a graphic image of a GUI (graphic user interface) of functionality in the map designer where dummy data 800 is bound to the map, according to an embodiment of the invention. This data could come from any source and be bound in a variety of ways. In this example, the dummy dataset includes columns "WARD" and "AMT". Elsewhere in the designer, the data type for AMT could be set to NUMERIC.

Figure 9:
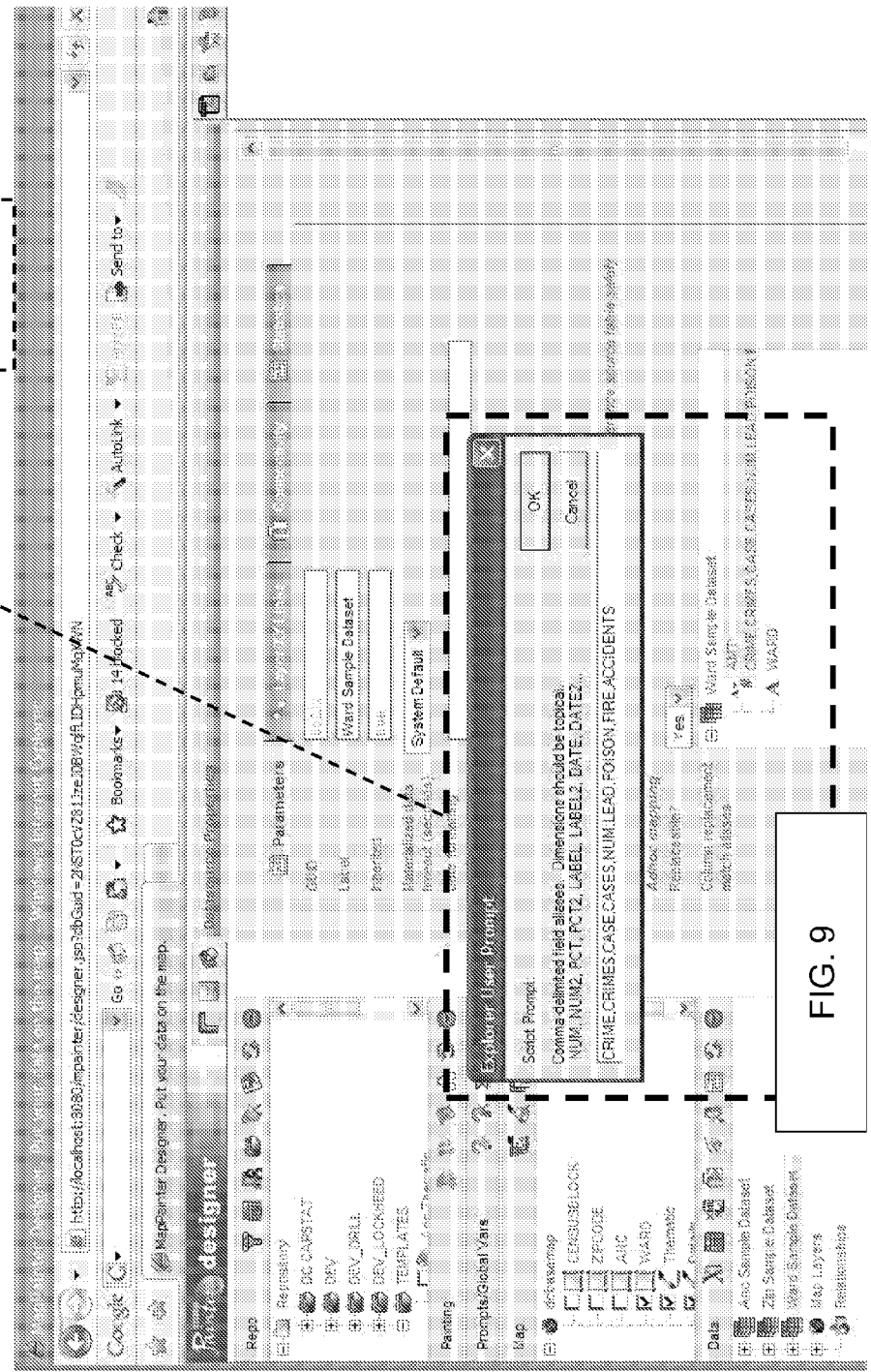
FIG. 9 is a graphic image of a GUI (graphic user interface) for an example template designer column alias (matching hints) editor for column "AMT", according to an embodiment of the invention.

FIG. 9 is a graphic image of a GUI (graphic user interface) of functionality in the map designer where data matching hints, in this case column aliases, are defined for columns in the dummy dataset 900, according to an embodiment of the invention. Were other matching algorithms to be in use, other kinds of matching hint or parameter editors would be provided.

Example Using a Client Application

Figure 10:
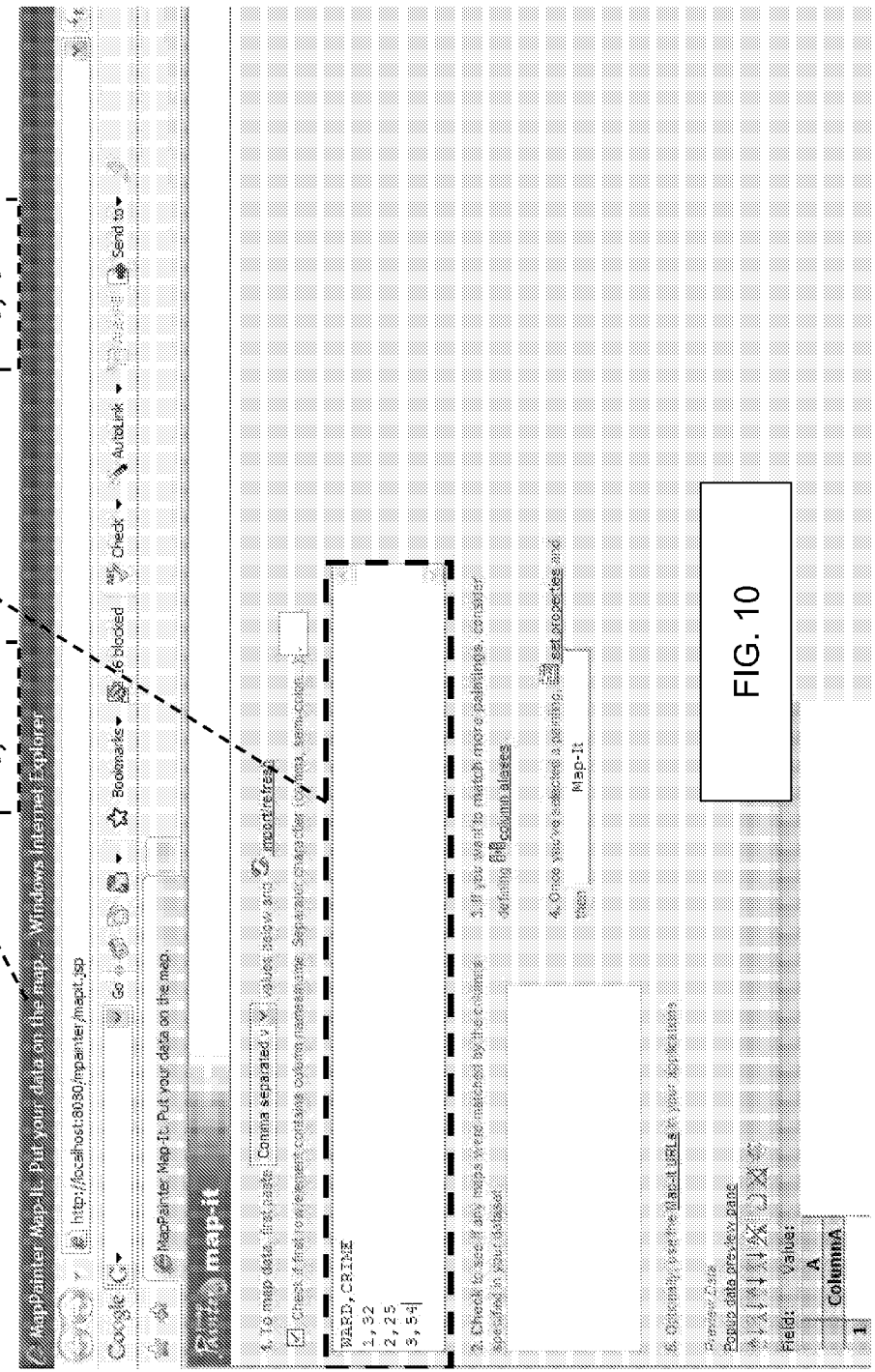
FIG. 10 is a graphic image of a GUI (graphic user interface) for an example client data capture application with sample data prior to discovery/invocation, according to an embodiment of the invention.

FIG. 10 is a graphic image of a GUI (graphic user interface) map data screen for inputting a dataset 1000 according to an embodiment of the invention. In this example, an end-user may be adding a small recordset 1100 into the connector component application. In one embodiment, the connector component application may be the MapPainters$^{SM}$ "map-it" application, available from Interactive Documents, LLC of Wynnewood, Pa. which may be a single-purpose client tool designed to illustrate the mapping data replacement concept.

Figure 11:
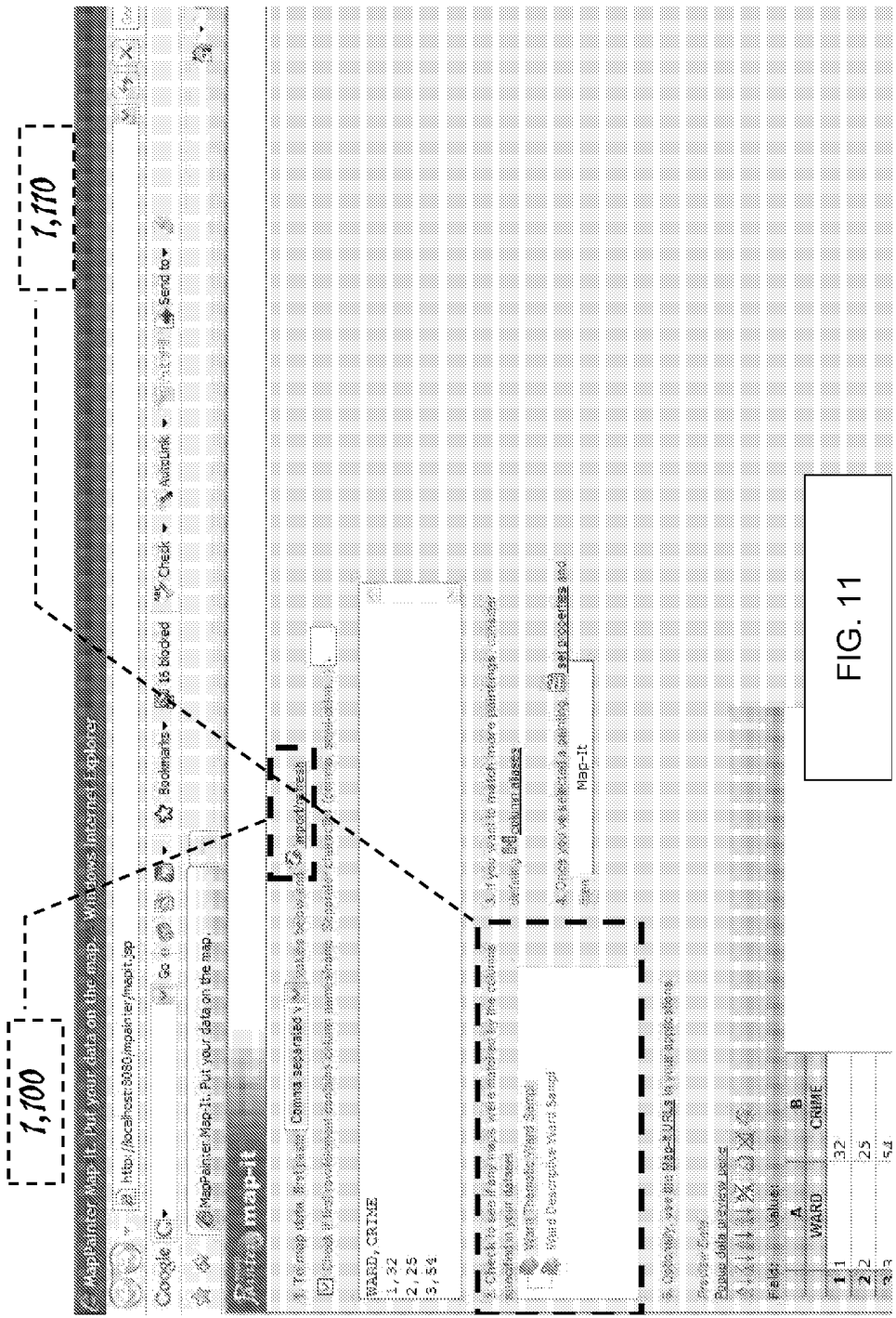
FIG. 11 is a graphic image of a GUI (graphic user interface) for an example client data capture application after invocation using import/refresh link, showing matched maps, according to an embodiment of the invention.
Figure 12:
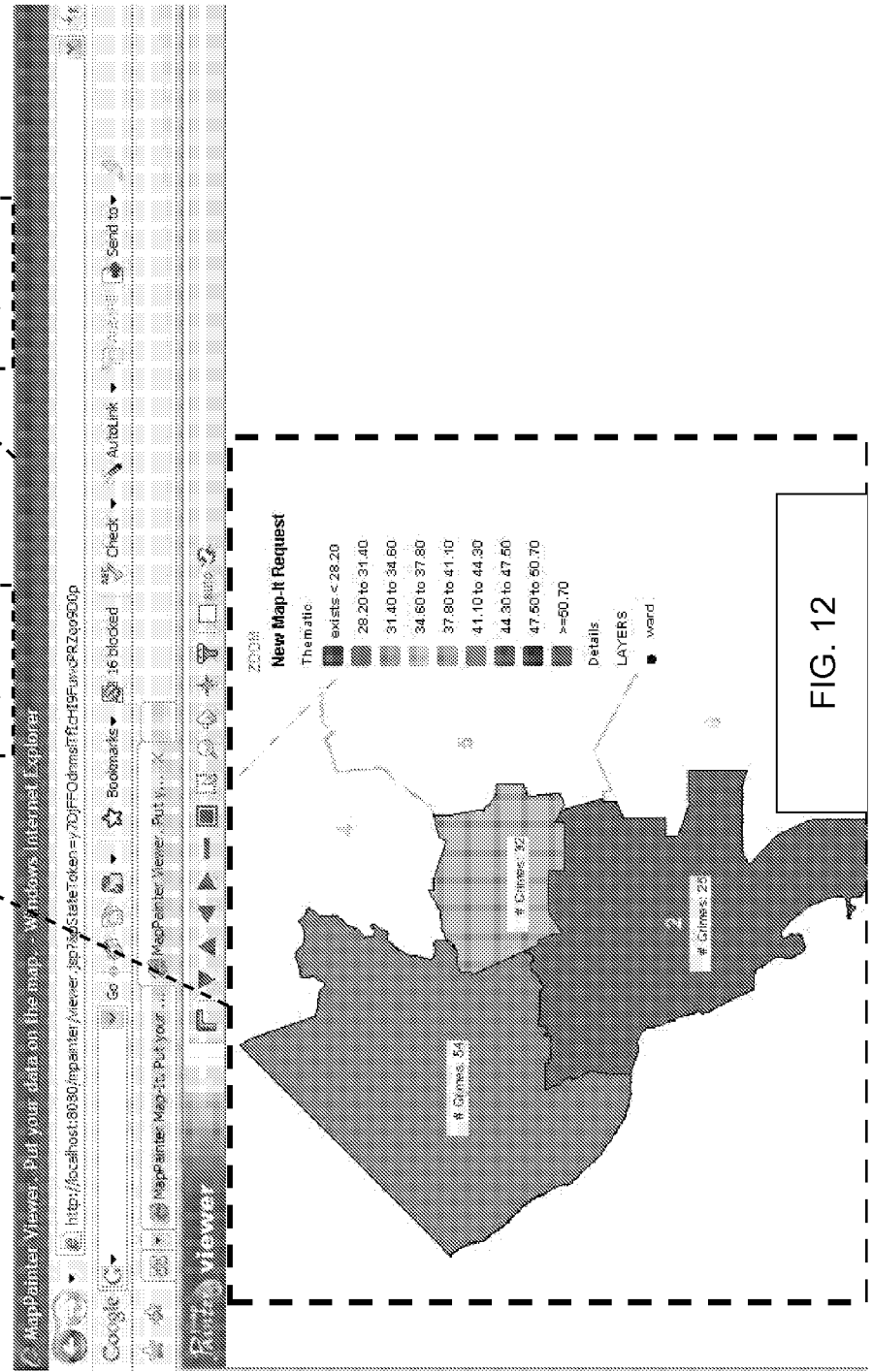
FIG. 12 is a graphic image of a GUI (graphic user interface) for an example map representing data entered into the example client data capture application, shown in an interactive map viewer, according to an embodiment of the invention.

FIG. 11 is a graphic image of a GUI screen for displaying a data swap test according to an embodiment of the invention. After setting data and then clicking the import/refresh link 1100 the system may match the client record set with several templates datasets 1110 containing matching datasets. In this case, two datasets were matched: "Ward Sample Dataset" in a map template "Ward Thematic" and "Ward Sample Dataset" in a map template "Ward Descriptive". The interface permits a template to be selected and data replacement and viewing to be invoked, using the "map-it" button. The map shown in FIG. 12 may be illustrative of what may then be presented to the user when the user selects "Ward Thematic.Ward Sample" and clicks "map-it" button (shown on FIG. 11). This screen capture (see FIG. 12) may show the final result in a new browser window that may overlay the client data capture application. In this workflow, neither column match aliases nor map properties have been edited in the client application. In one embodiment, the viewer application may be the MapPainters$^{SM}$ "viewer" application, available from Interactive Documents, LLC of Wynnewood, Pa.

A point of interest here is that the column "CRIME" is not actually present in the recordset in the "Ward Sample Dataset" 800. However, in the design-environment, an alias "CRIME" was defined 900, which matches the column called "CRIME" in the client data. Similarly, this alias could be defined in the column matching hints editor 1900, in the client application. Here, AMT in the dummy dataset is matched to the client column "CRIME" through an alias called "CRIME" which is defined in the design-environment. The match is made by the server-side matching process which in this embodiment considers both server and client-defined aliases when trying to match client with server-side datasets. Please note that in this representation, there may be two semantically meaningful columns. WARD may not just be a string value name. WARD identifies a geographic region and has very specific meaning for this map; data from a column called "COUNTRY" could replace it with intended results. CRIME may not be just a number. It may, for example, be a number that is a percent value, or within a certain range. In this case, it is a number that is effectively relative to the other numbers, and the map has been configured to adjust color bands based on the max and min values it finds.

Example Using a Business Data Reporting Application

Figure 13:
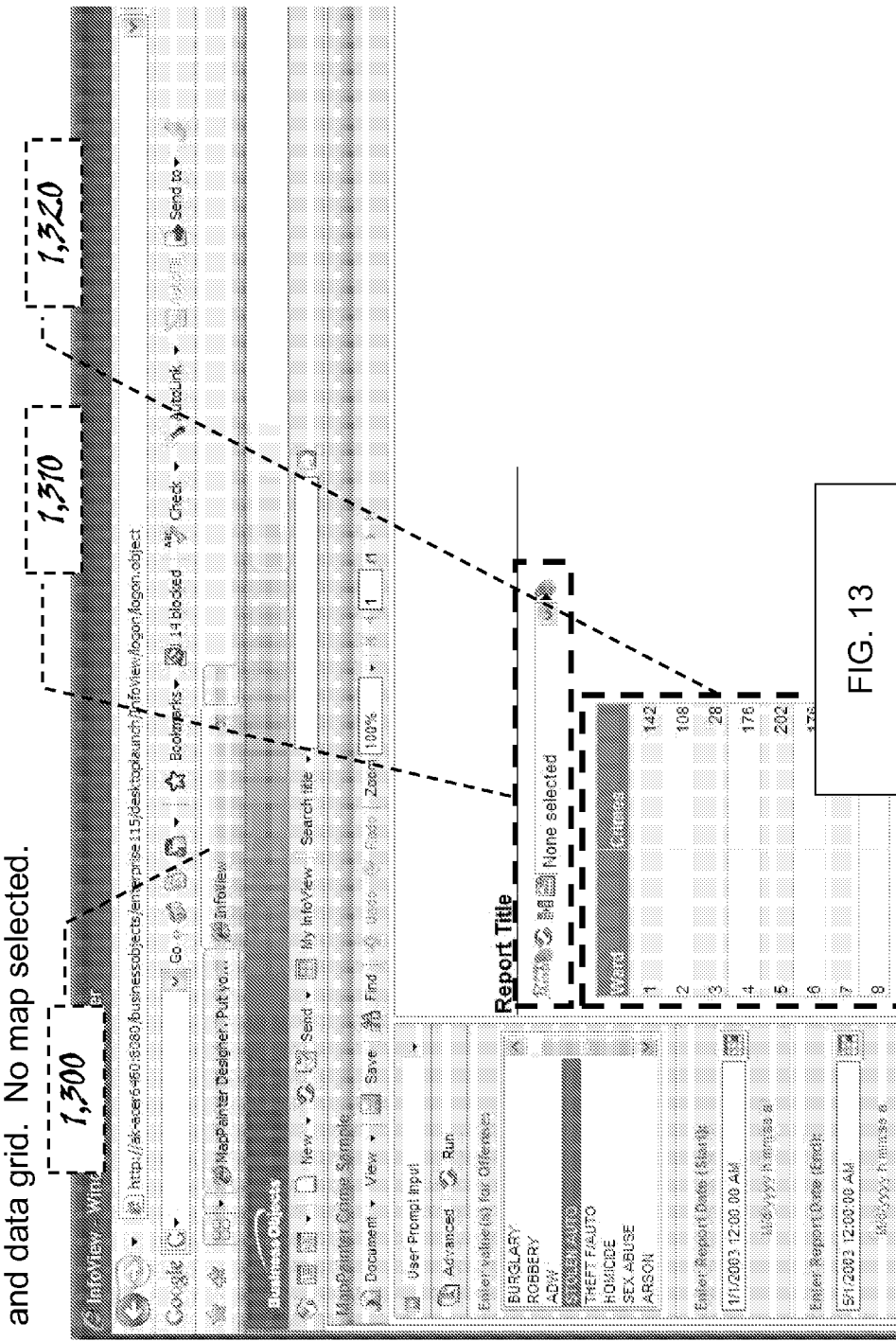
FIG. 13 is a graphic image of a GUI (graphic user interface) for an example client-side query and analysis application with map selector control and dataset, according to an embodiment of the invention.

FIG. 13 is a graphic image of a GUI screen for displaying candidate map information in a business data reporting application 1300 according to an embodiment of the invention. In this example, an end-user may be building or viewing a report in a business data reporting application (e.g., the Business Objects™ WebIntelligence™ reporting tool). The connector component may be added into the reporting canvas, and its interface may appear in several interactive widgets 1310 that render in the reporting application. The dropdown selector list may include candidate maps that the system may discover and determine are capable of rendering the current client dataset 1320. In one embodiment, the connector may be the MapPainters$^{SM}$ "WebIntelligence Connector" application, available from Interactive Documents, LLC of Wynnewood, Pa.

Figure 14:
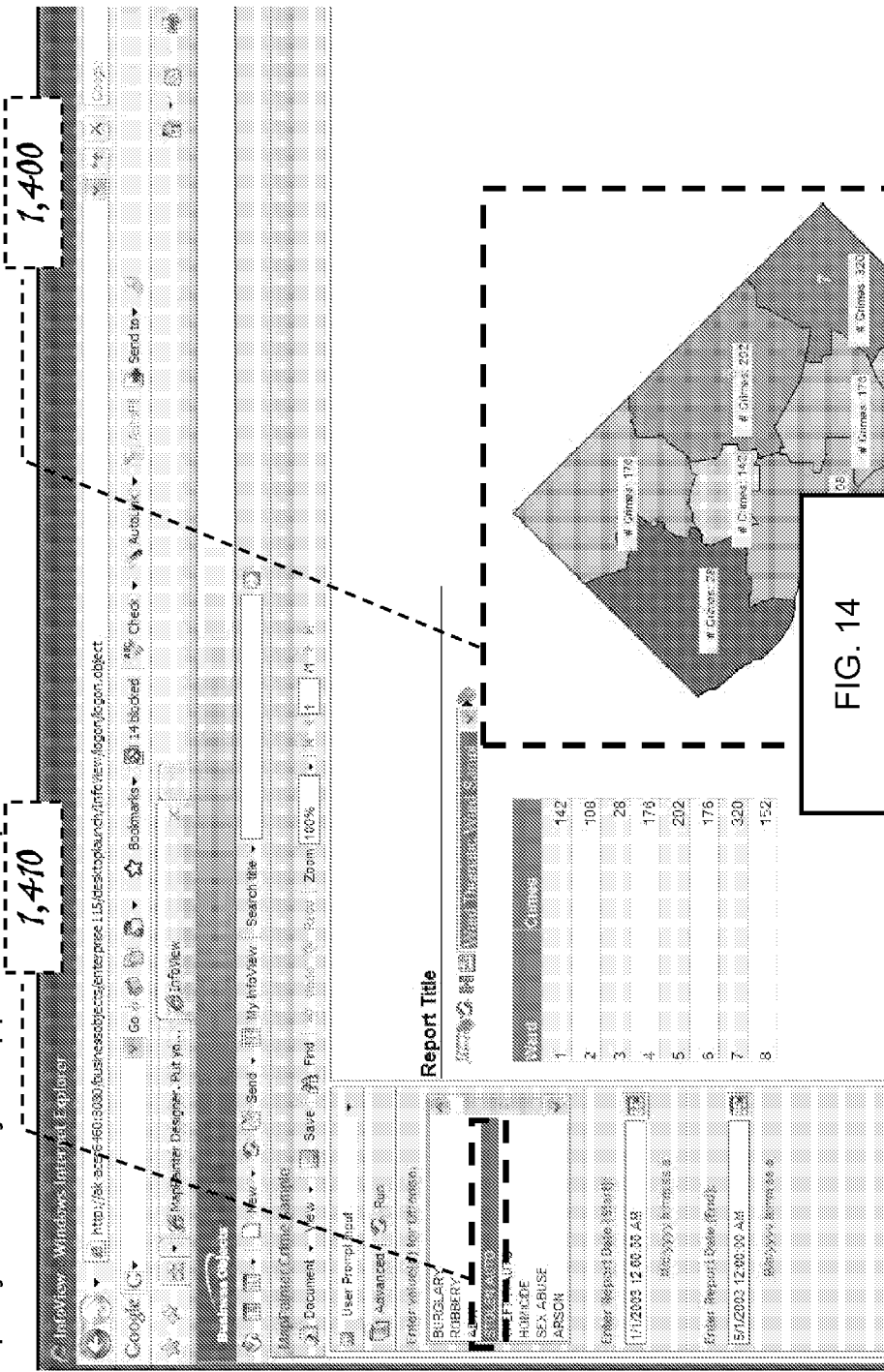
FIG. 14 is a graphic image of a GUI (graphic user interface) for an example client-side query and analysis application after map selection and invocation ("Ward Thematic"), showing the map image on the report canvas where crime filter=STOLEN AUTO, according to an embodiment of the invention.

FIG. 14 is a graphic image of a GUI screen for displaying an invoked client map 1400 according to an embodiment of the invention. When the invoke button is pressed, the client data from the report may be shown on a new map based on the map template that was selected from the candidate maps. The dataset in the client reporting application represents crimes filtered by the type "STOLEN AUTO" 1410.

Figure 15:
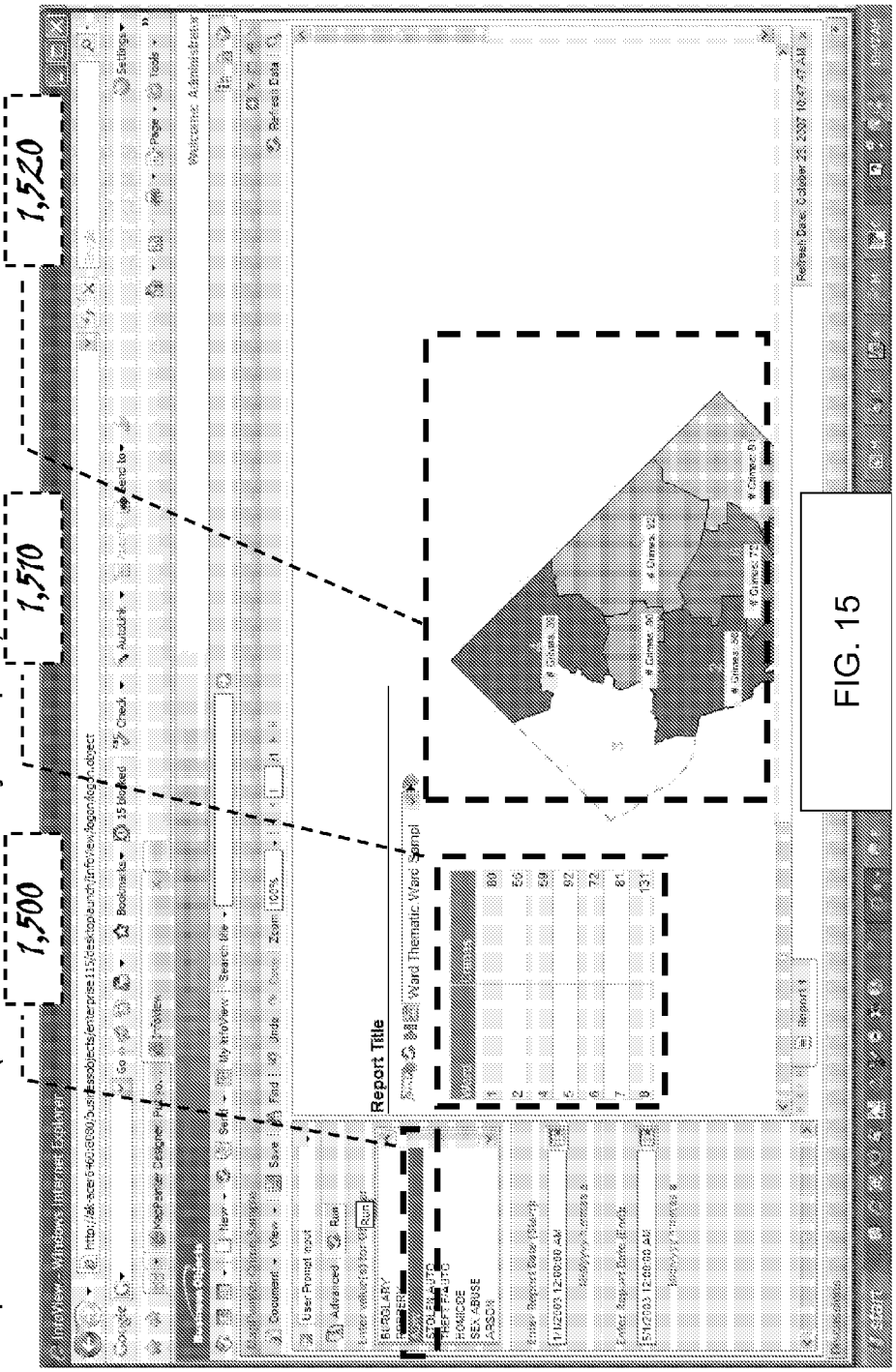
FIG. 15 is a graphic image of a GUI (graphic user interface) for an example client-side query and analysis application after map selection and invocation, after changing the crime filter to ADW and subsequently changing the dataset, showing the updated map image on the report canvas, according to an embodiment of the invention.

FIG. 15 is a graphic image of a GUI screen for displaying an invoked client map 1520, according to an embodiment of the invention. In this case, the data has been filtered by crime type "ADW" (Assault with a deadly weapon) 1500, and the resulting dataset 1510 has changed from FIG. 14. When the invoke button is pressed, the client data from the report may be shown on a new map based on the map template that was selected from the candidate maps.

Figure 16:
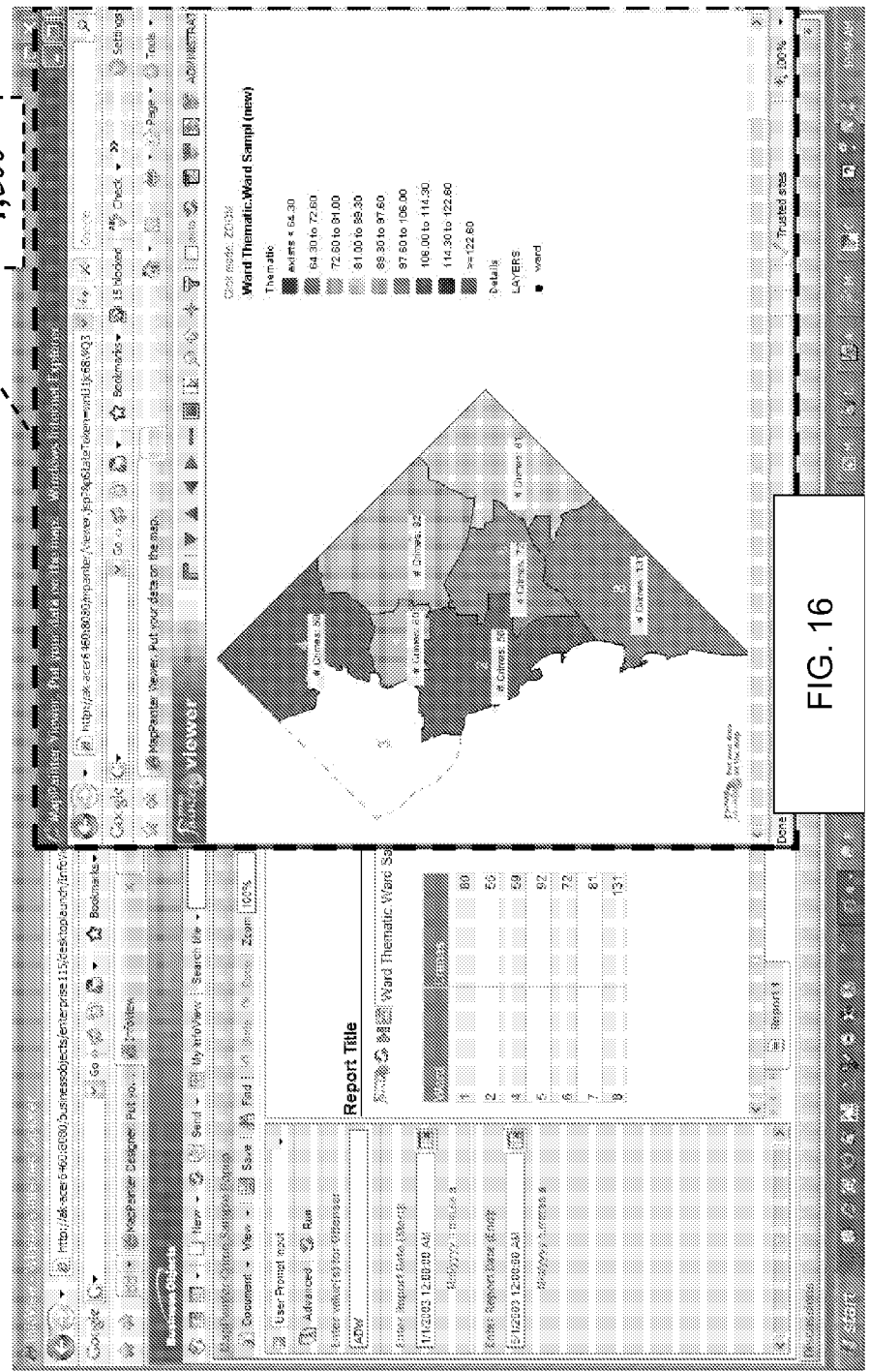
FIG. 16 is a graphic image of a GUI (graphic user interface) for an example client-side query and analysis application after map selection and invocation, showing the interactive map viewer popped-up in its own window, according to an embodiment of the invention.

FIG. 16 is a graphic image of a GUI screen for displaying an invoked client map 1600, according to an embodiment of the invention. In this case, the map is shown in the interactive map viewer and is not part of the client reporting application canvas itself.

Figure 17:
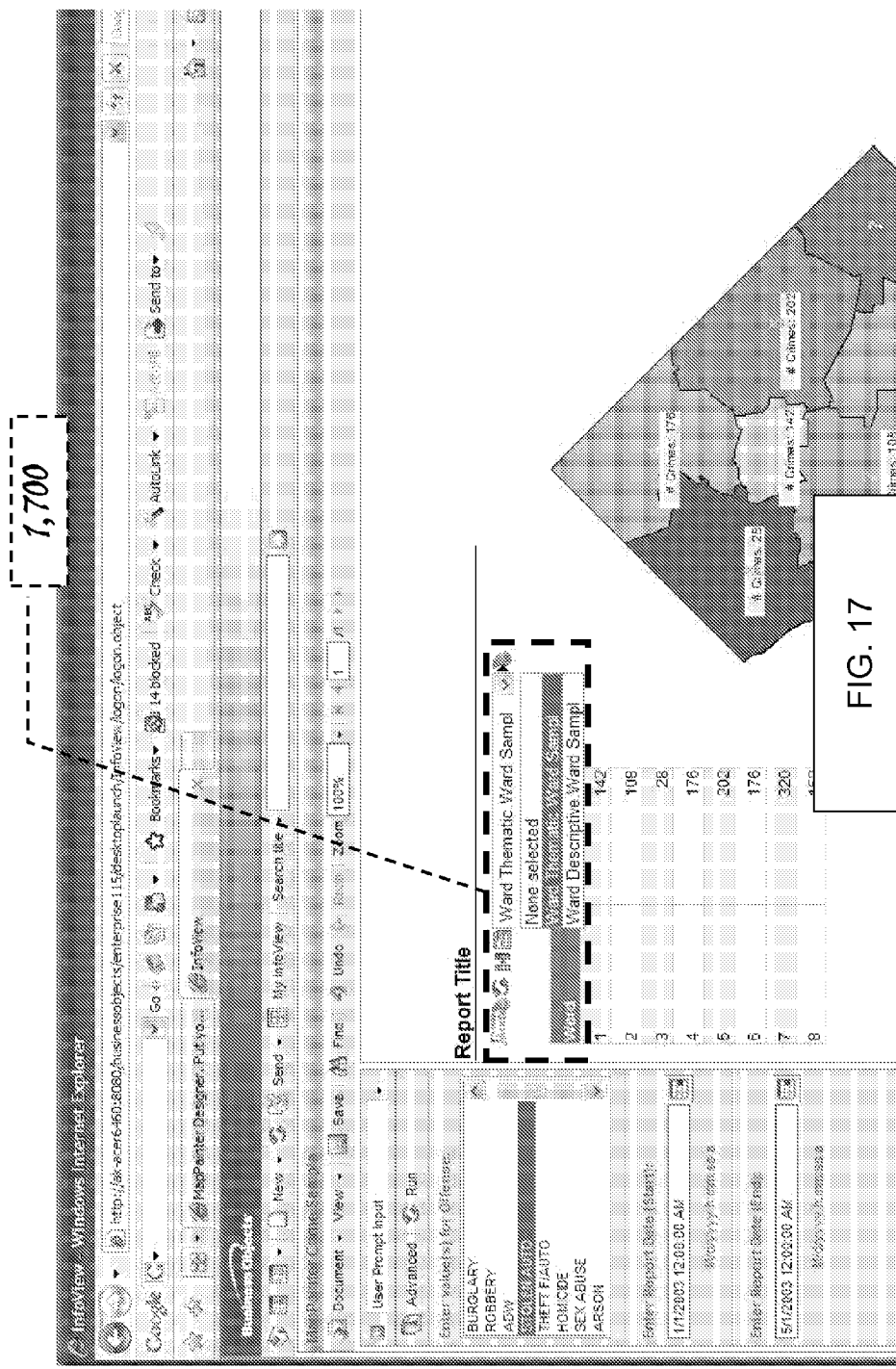
FIG. 17 is a graphic image of a GUI (graphic user interface) for an example client-side query and analysis application with map selector control showing multiple matching maps, according to an embodiment of the invention.
Figure 18:
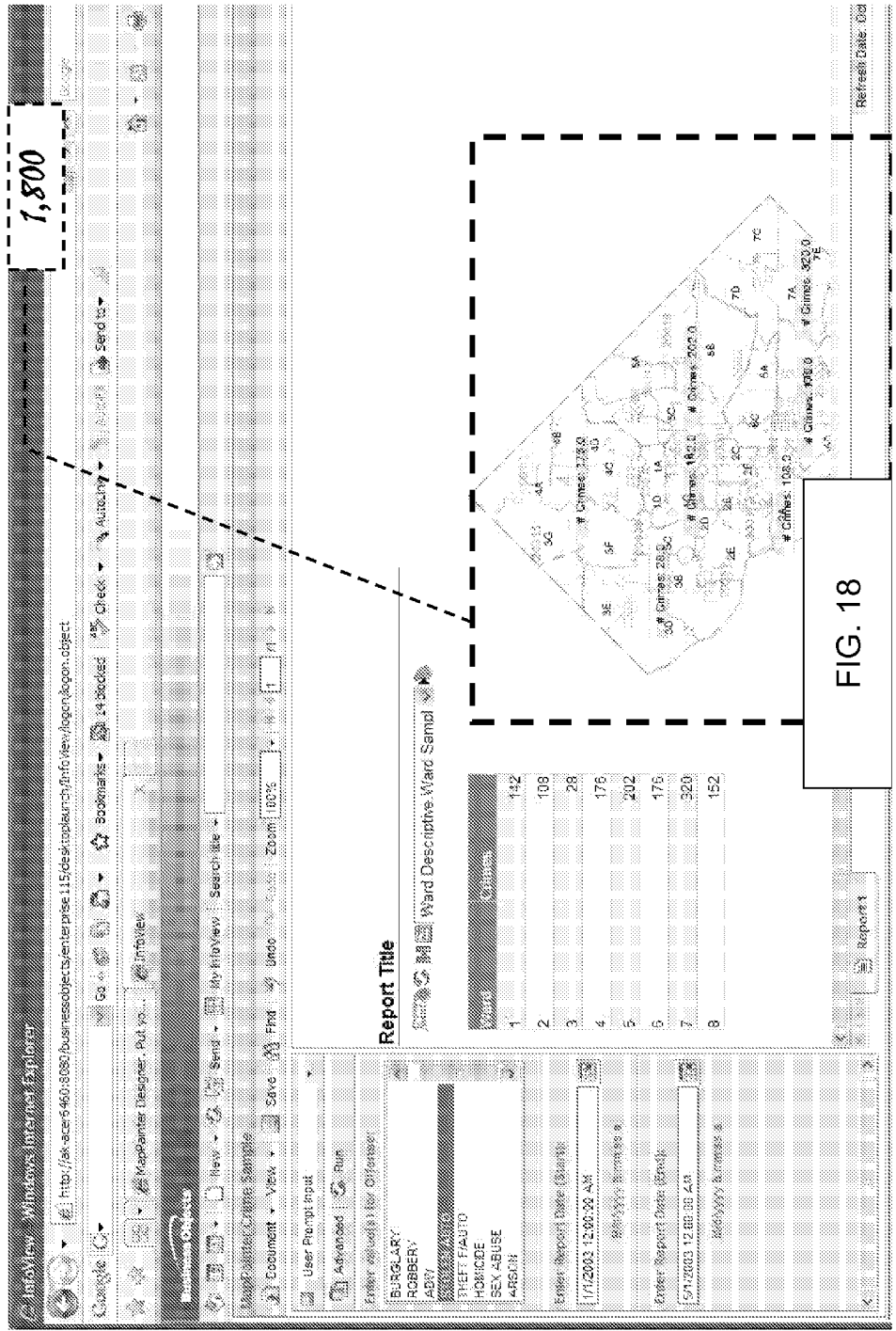
FIG. 18 is a graphic image of a GUI (graphic user interface) for an example client-side query and analysis application after selecting and invoking an alternate map ("Ward Descriptive"), showing the map image, on the report canvas, according to an embodiment of the invention.

FIG. 17 is a graphic image of a GUI screen for displaying the selection of an alternate map from the connector select list 1700, according to an embodiment of the invention. The result of selecting the alternate map ("Ward Descriptive") from this list and then invoking it, is shown in FIG. 18.

Figure 19:
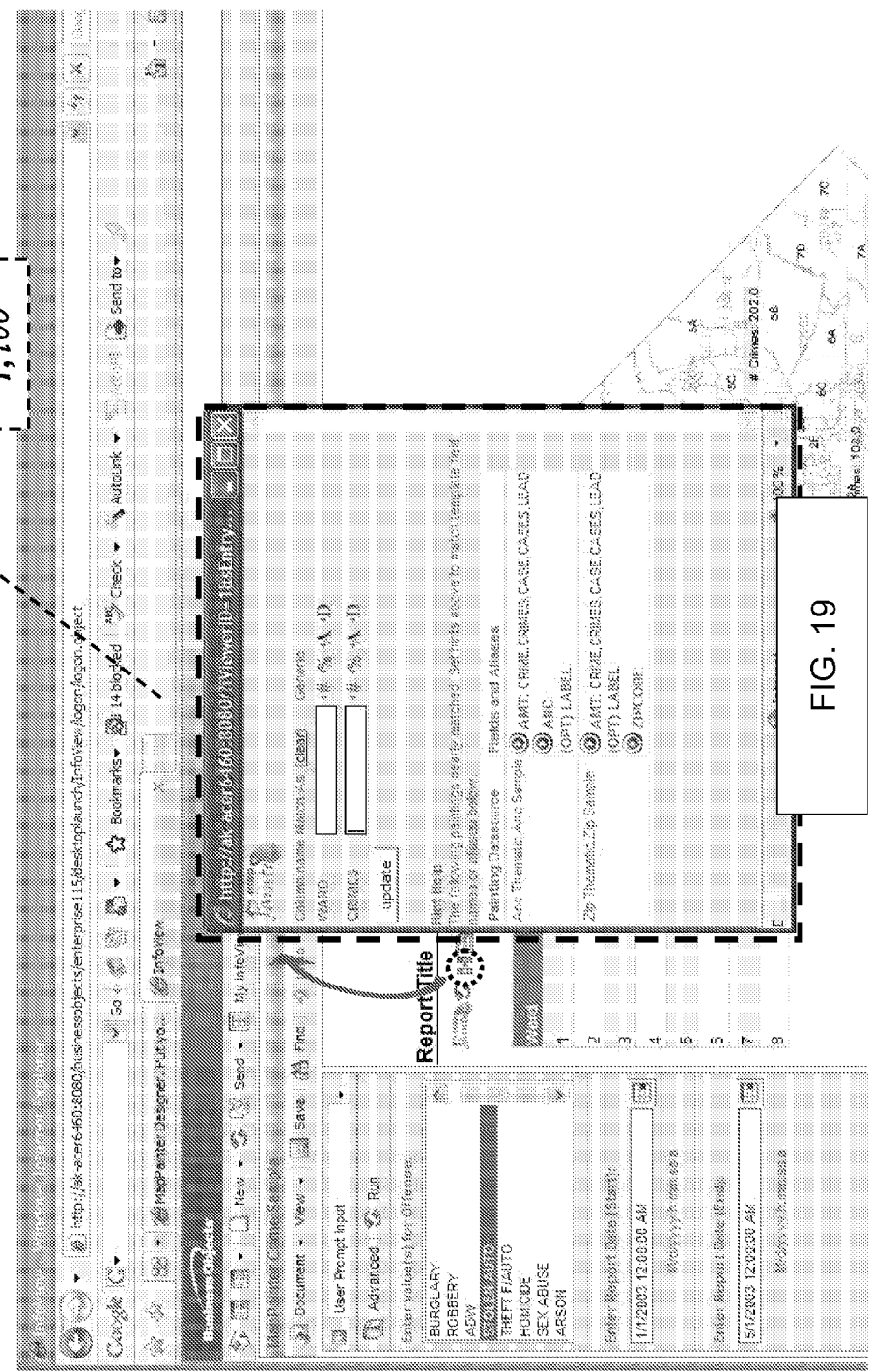
FIG. 19 is a graphic image of a GUI (graphic user interface) for an example client-side column-name alias (match hint) editor, showing near matches below to help inform the creation of match hints, according to an embodiment of the invention.

FIG. 19 is a graphic image of a GUI screen for displaying an example client-side match hint editor, according to an embodiment of the invention. In this case, we see that two additional matches are possible if the alias ANC or ZIPCODE were used. However, the user would not alias WARD to either ANC or ZIPCODE since they both represent different but smaller, geographic regions. Technically, the match is possible, however practically; it would not make sense to do it.

FIG. 20 is a graphic image of a GUI screen for displaying a map properties editor, according to an embodiment of the invention. Through such an interface we could fill prompts on the map, change its size, name, or set other properties.

In one embodiment, a computer program product including a computer readable medium (e.g., one or more of DVD's, CD's, diskettes, tapes, and/or other suitable medium) provides software instructions for all or part of the software described herein (e.g., connector component application, delivery application, and/or designer application). The computer program product may be installed from the computer readable medium by any suitable software installation procedure, as is well known in the art. A computer program propagated signal product embodied on a propagated signal on a propagation medium (e.g., an electrical signal propagated over the Internet or other network, a radio wave, an infrared wave, or other electromagnetic wave) provides software instructions for all or part of the software described herein (e.g., connector component application, delivery application, and/or designer application). Alternatively, the propagated signal is an analog carrier wave or a digital signal carried on the propagated medium. For example, the propagated signal may be a digitized signal propagated over the Internet or other network. In one embodiment, the propagated signal is a signal that is transmitted over the propagation medium over a period of time, such as the instructions for the software (e.g., connector component application, delivery application, and/or designer application) sent in segments (e.g., packets) over a network over a period typically of seconds, minutes, or longer.

In another example, the functions of embodiments of the invention as described herein may be implemented in one or more hardware devices, such as an integrated circuit (IC), an ASIC (application specific integrated circuit), PLD (programmable logic device), or programmable gate array.

In a further example, the connector component application, delivery application, and/or designer application may be combined or distributed (as in a distributed computing approach). For example, the delivery application and designer application may be located on the same computing device. Alternatively, the delivery application and designer application may be distributed (e.g., located on different computing devices connected by a network). In another example, the repository may be collocated with the delivery server (that is, in the same physical cabinet or box), connected by a direct (e.g., cable) connection, or located remotely (e.g., through a storage area network, wireless connection, or over the Internet).

Although embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A method, comprising:
   (A) receiving, from a client computing device at a delivery server, a user data set, the user data set including a first plurality of fields, wherein the first plurality of fields comprises dynamic structured data;
   (B) determining, via the delivery server, whether the user data set matches one or more of a plurality of ready-built design templates stored in a repository, each of the plurality of ready-built design templates including a second plurality of fields comprising replaceable data, based on one or more of the group consisting of a comparison between the first plurality of fields and the second plurality of fields, a comparison between a first plurality of labels corresponding to the first plurality of fields and a second plurality of labels corresponding to the second plurality of fields, a comparison between the user data set and a data descriptor, and a comparison between a data type of at least one of the first plurality of fields and a data type of at least one of the second plurality of fields;
   (C) returning, to client computing device, an output representing a matching subset of the plurality of ready-built design templates stored in the repository;
   (D) receiving, from the client computing device, input representing a selection by a user of at least one ready-built design template from the matching subset; and
   (E) generating a graphical representation on the client computing device by replacing the replaceable data of the second plurality of fields of the selected at least one ready-built design template from the matching subset with the data set of the first plurality of fields.

2. The method of claim 1, wherein (B) comprises determining, via the delivery server, that a plural subset of the one or more of the plurality of ready-built design templates matches the user data set, and wherein the method further comprises:
   (F) presenting, to a user, output representing the plural subset of the one or more of the plurality of ready-built design templates; and
   (G) receiving, from the user, input representing a selection by the user of one of the plural subset of the one or more of the plurality of ready-built design templates.

3. The method of claim 1, wherein the first plurality of labels comprises at least one of a first plurality of column names and a first plurality of column aliases, and wherein the second plurality of labels comprises at least one of a second plurality of column names and a second plurality of column aliases.

4. The method of claim 1, wherein (B) comprises determining, via the delivery server, whether the user data set matches the one or more of the plurality of the ready-built design templates by at least one of determining whether the first corresponding plurality of labels match the second corresponding plurality of labels verbatim, and determining whether the first corresponding plurality of labels match synonyms of the second corresponding plurality of labels.

5. The method of claim 1, wherein (B) comprises determining, via the delivery server, whether the first plurality of fields is equal in number to or greater in number than the second plurality of fields.

6. The method of claim 1, further comprising:
   (F) receiving, from a user, input representing a hint; and wherein (B) comprises determining whether the user data set matches the one or more of the plurality of ready-built design templates based on the hint.

7. The method of claim 1, wherein (B) comprises determining, via a delivery server, whether the user data set matches the one or more of the plurality of ready-built design templates based on a comparison between the user data set and a design template data set of the one or more of the plurality of ready-built design templates.

8. The method of claim 1, wherein the first plurality of fields includes a first field including a datum including a first value, wherein the second plurality of fields includes a second field corresponding to the first field, wherein the second field is associated with a domain membership function, and wherein (B) comprises determining, via a delivery server, whether the first value satisfies the domain membership function.

9. The method of claim 8, wherein the domain membership function defines at least one of a range of values, a semantic meaning, and a phonetic feature, and wherein (B) comprises at least one of determining, via a delivery server, whether the first value is within the range of values, determining whether the first value has the semantic meaning, and determining whether the first value has the phonetic feature.

10. The method of claim 1, further comprising: (F) providing, by the delivery server, data from the user data set into the one or more of the plurality of ready-built design templates.

11. The method of claim 1, wherein the one or more of the plurality of ready-built design templates comprise a template for at least one of a geographical map and a business report, and wherein the graphical representation comprises rendering an image of at least one of the geographical map and the business report incorporating the user data.

12. The method of claim 1, further comprising: (F) prior to (B), receiving, from a user, input modifying the first plurality of fields to provide a first modified plurality of fields; and wherein (B) comprises determining whether the user data set matches the one or more of the plurality of ready-built design templates based on a comparison between the first modified plurality of fields and the second plurality of fields.

13. The method of claim 1 wherein (B) comprises determining, via the delivery server, that a plural subset of the one or more of the plurality of ready-built design templates matches the user data set, and wherein the method further comprises: (F) automatic selection of one of the plural subset of the plurality of design templates based on prior user selections or system or user presets.

14. The method of claim 1, wherein (B) comprises determining based on one or more of the group consisting of a comparison between an entirety of the first plurality of fields and an entirety of the second plurality of fields, a comparison between a first plurality of labels corresponding to an entirety of the first plurality of fields and a second plurality of labels corresponding to an entirety of the second plurality of fields, a comparison between an entirety of the user data set and the data descriptor, and a comparison between a data type of at least one of the first plurality of fields and a data type of at least one of the second plurality of fields.

15. A design and data replacement system, comprising:
a client computing device;
a delivery server; and
a repository including a plurality of ready-built design templates,
wherein the delivery server comprises logic configured to:

(A) receive, from the client computing device, a user data set, the user data set including a first plurality of fields, wherein the first plurality of fields comprises dynamic structured data;

(B) determine whether the user data set matches one or more of the plurality of ready-built design templates stored in the repository, each of the plurality of ready-built design templates including a second plurality of fields comprising replaceable data, based on one or more of the group consisting of a comparison between the first plurality of fields and the second plurality of fields, a comparison between a first plurality of labels corresponding to the first plurality of fields and a second plurality of labels corresponding to the second plurality of fields, a comparison between the user data set and a data descriptor, and a comparison between a data type of at least one of the first plurality of fields and a data type of at least one of the second plurality of fields;

(C) return, to the client computing device, an output representing a matching subset of the plurality of read-built design templates stored in the repository;

(D) receive, from the client computing device, input representing a selection by a user of at least one ready-built design template from the matching subset; and (E) generate a graphical representation on the client computing device by replacing the replaceable data of the second plurality of fields of the selected at least one ready-built design template from the matching subset with the data set of the first plurality of fields.

16. The design and data replacement system of claim 15, wherein (B) comprises determining that a plural subset of the one or more plurality of ready-built design templates matches the user data set, and wherein the delivery server further comprises logic configured to:
(F) present, to a user, output representing the plural subset of the one or more of the plurality of ready-built design templates; and
(G) receive, from the user, input representing a selection by the user of one of the plural subset of the one or more of the plurality of ready-built design templates.

17. The design and data replacement system of claim 15, wherein the first plurality of labels comprises at least one of a first plurality of column names and a first plurality of column aliases, and wherein the second plurality of labels comprises at least one of a second plurality of column names and a second plurality of column aliases.

18. The design and data replacement system of claim 15, wherein (B) comprises determining whether the data set matches the one or more of the plurality of the ready-built design templates by at least one of determining whether the first corresponding plurality of labels match the second corresponding plurality of labels verbatim, and determining whether the first corresponding plurality of labels match synonyms of the second corresponding plurality of labels.

19. The design and data replacement system of claim 15, wherein (B) comprises determining whether the first plurality of fields is equal in number to or greater in number than the second plurality of fields.

20. The design and data replacement system of claim 15, wherein the delivery server further comprises logic configured to:
(F) receive, from a user, input representing a hint; and
wherein (B) comprises determining whether the user data set matches the one or more of the plurality of ready-built design templates based on the hint.

21. The design and data replacement system of claim 15, wherein (B) comprises determining whether the user data set matches the one or more of the plurality of ready-built design template based on a comparison between the user data set and a design template data set of the one or more of the plurality of ready-built design templates.

22. The design and data replacement system of claim 15, wherein the first plurality of fields includes a first field including a datum including a first value, wherein the second plurality of fields includes a second field corresponding to the first field, wherein the second field is associated with a domain membership function, and wherein (B) comprises determining whether the first value satisfies the domain membership function.

23. The design and data replacement system of claim 22, wherein the domain membership function defines at least one of a range of values, a semantic meaning, and a phonetic feature, and wherein (B) comprises at least one of determining whether the first value is within the range of values, determining whether the first value has the semantic meaning, and determining whether the first value has the phonetic feature.

24. The design and data replacement system of claim 15, wherein the delivery server further comprises logic configured to:
provide data from the user data set into the one or more of the plurality of ready-built design templates.

25. The design and data replacement system of claim 15, wherein the one or more of the plurality of ready-built design templates comprise a template for at least one of a geographical map and a business report, and wherein the geographical representation comprises rendering an image of at least one of the geographical map and the business report incorporating the user data.

26. The design and data replacement system of claim 15, wherein the delivery server further comprises logic configured to:
(F) prior to (B), receive, from a user, input modifying the first plurality of fields to provide a first modified plurality of fields; and wherein (B) comprises determining whether the user data set matches the one or more of the plurality of ready-built design templates based on a comparison between the first modified plurality of fields and the second plurality of fields.

27. The design and data replacement system of claim 15, wherein (B) comprises determining that a plural subset of the one or more of the plurality of ready-built design templates matches the user data set, and wherein the delivery server further comprises logic configured to:
(F) automatically select one of the plural subset of the plurality of design templates based on prior user selections or system or user presets.

28. The design and data replacement system of claim 15, wherein (B) comprises determining based on one or more of the group consisting of a comparison between an entirety of the first plurality of fields and an entirety of the second plurality of fields, a comparison between a first plurality of labels corresponding to an entirety of the first plurality of fields and a second plurality of labels corresponding to an entirety of the second plurality of fields, a comparison between an entirety of the user data set and the data descriptor, and a comparison between a data type of at least one of the first plurality of fields and a data type of at least one of the second plurality of fields.

\* \* \* \* \*